United States Patent
Sugawara

(10) Patent No.: US 12,228,205 B2
(45) Date of Patent: Feb. 18, 2025

(54) WORM REDUCER

(71) Applicant: NSK STEERING & CONTROL, INC., Tokyo (JP)

(72) Inventor: Hiroyuki Sugawara, Gunma (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 18/574,626

(22) PCT Filed: Jun. 8, 2022

(86) PCT No.: PCT/JP2022/023203
§ 371 (c)(1),
(2) Date: Dec. 27, 2023

(87) PCT Pub. No.: WO2023/276598
PCT Pub. Date: Jan. 5, 2023

(65) Prior Publication Data
US 2024/0175489 A1    May 30, 2024

(30) Foreign Application Priority Data
Jun. 28, 2021 (JP) ................................. 2021-106314

(51) Int. Cl.
*F16H 57/12* (2006.01)
*B62D 5/04* (2006.01)
(Continued)

(52) U.S. Cl.
CPC ............... *F16H 57/12* (2013.01); *F16H 1/16* (2013.01); *F16H 57/021* (2013.01);
(Continued)

(58) Field of Classification Search
CPC .............. F16H 1/16; F16H 55/24; B62D 3/04
See application file for complete search history.

(56) References Cited

U.S. PATENT DOCUMENTS 9,010,483 B2 * 4/2015 Kimoto ................ B62D 5/0409
180/444
11,536,348 B2 * 12/2022 Yagyu ................... F16H 57/039
(Continued)

FOREIGN PATENT DOCUMENTS

JP        2006-103391 A     4/2006
JP        4381024 B2        12/2009
(Continued)

OTHER PUBLICATIONS

International Search Report (PCT/ISA/210) issued by the International Searching Authority on Jul. 19, 2022 in corresponding International Application No. PCT/JP2022/023203.
(Continued)

*Primary Examiner* — Jake Cook
(74) *Attorney, Agent, or Firm* — Sughrue Mion, PLLC

(57) ABSTRACT

A holder has a holder engagement portion in at least a position sandwiching a pad from both sides in a third direction orthogonal to both a first direction that is an urging direction of an elastic member and a second direction that is an axial direction of a worm accommodation portion. The pad has a pad engagement portion that comes into contact with the holder engagement portion on at least one of both side portions in the third direction. Based on contact between the holder engagement portion and the pad engagement portion, displacement of the pad in the third direction with respect to the holder is regulated.

10 Claims, 25 Drawing Sheets

(51) Int. Cl.
  *F16H 1/16* (2006.01)
  *F16H 57/02* (2012.01)
  *F16H 57/021* (2012.01)
  *F16H 57/039* (2012.01)
(52) U.S. Cl.
  CPC ......... *F16H 57/039* (2013.01); *B62D 5/0403* (2013.01); *F16H 2057/02082* (2013.01); *F16H 2057/0213* (2013.01); *F16H 2057/127* (2013.01)

(56) References Cited

U.S. PATENT DOCUMENTS

| | | |
|---|---|---|
| 2014/0083794 A1 | 3/2014 | Ishii |
| 2015/0075899 A1 | 3/2015 | Kikuchi et al. |
| 2018/0156325 A1* | 6/2018 | Segawa ................. F16C 23/06 |
| 2019/0285157 A1 | 9/2019 | Segawa et al. |

FOREIGN PATENT DOCUMENTS

| | | |
|---|---|---|
| JP | 2013-155789 A | 8/2013 |
| JP | 2013-226898 A | 11/2013 |
| JP | 2014-61834 A | 4/2014 |
| JP | 2019-207026 A | 12/2019 |
| WO | 2018/016493 A1 | 1/2018 |

OTHER PUBLICATIONS

Written Opinion (PCT/ISA/237) issued by the International Searching Authority on Jul. 19, 2022 in corresponding International Application No. PCT/JP2022/023203.

Communication dated Oct. 7, 2024, issued by European Patent Office in European Patent Application No. 22832755.7.

* cited by examiner

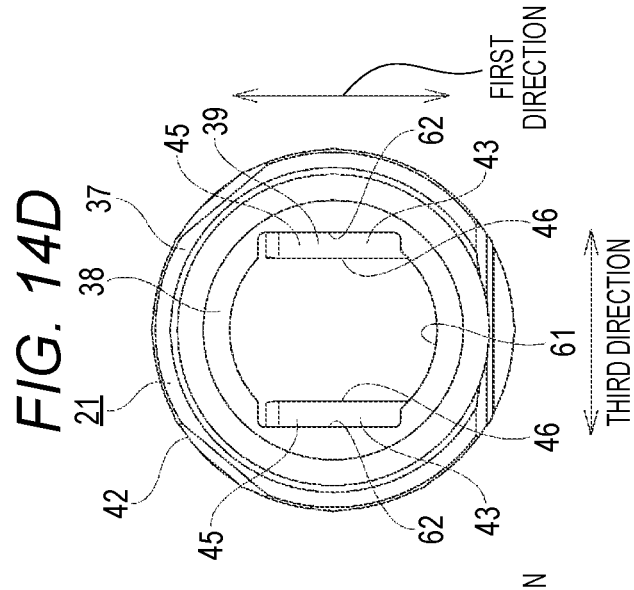
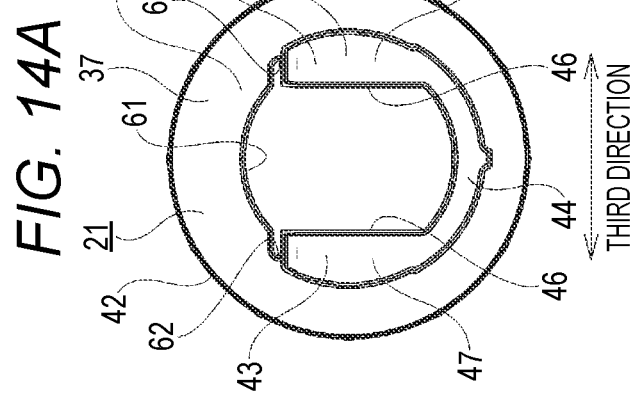
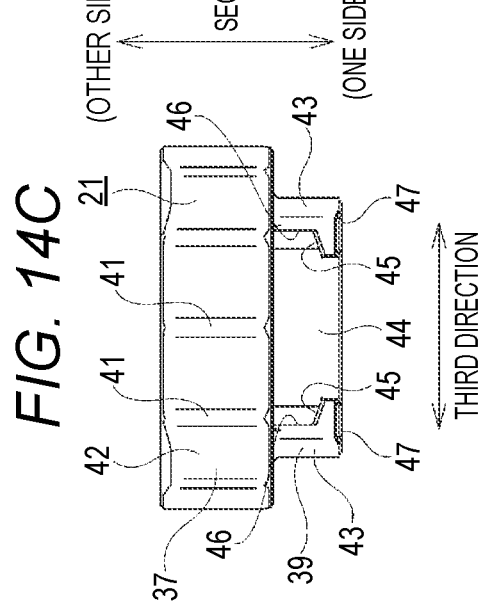
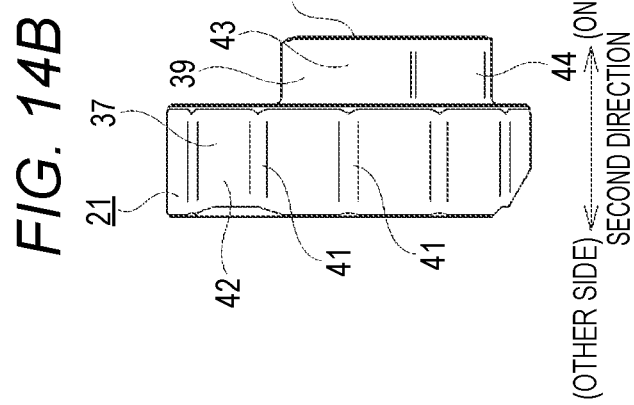

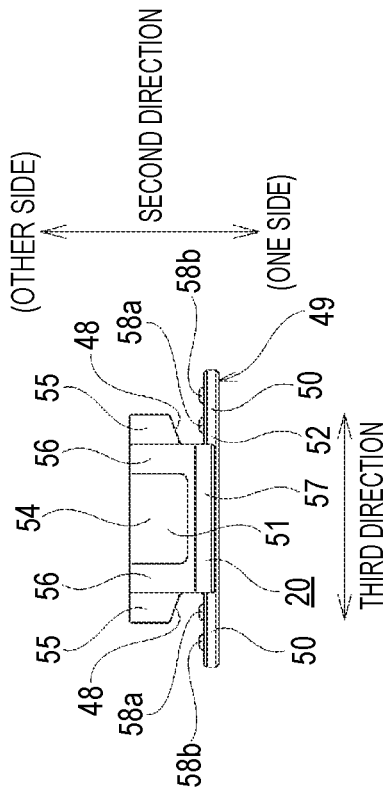
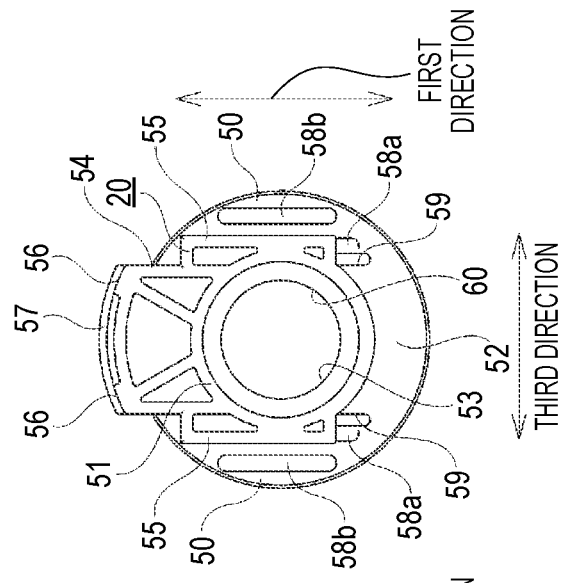
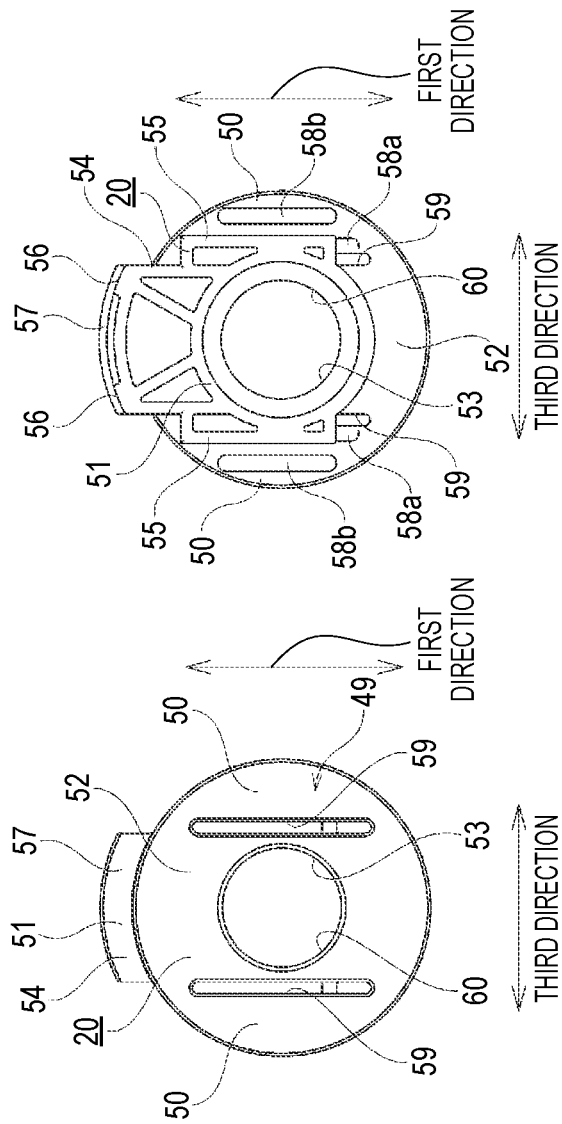
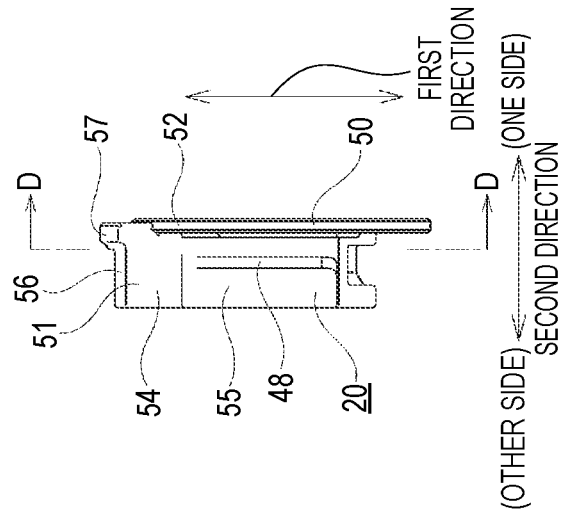

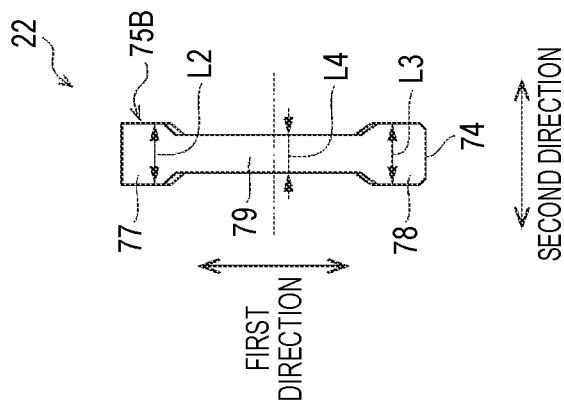
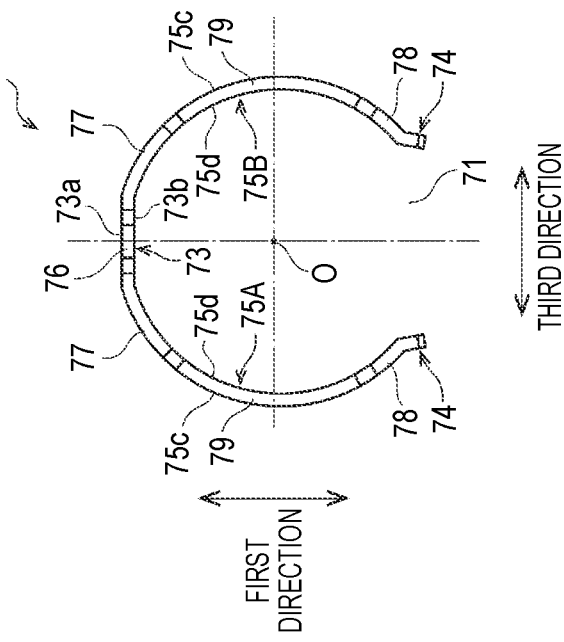
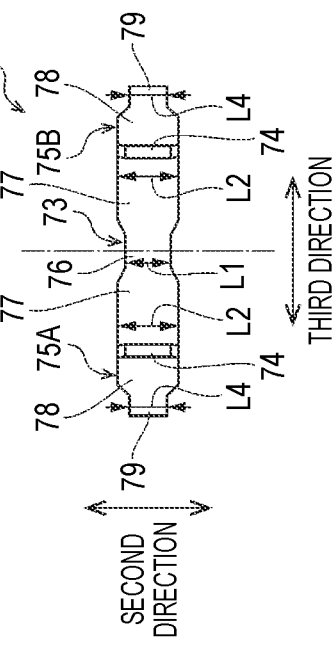
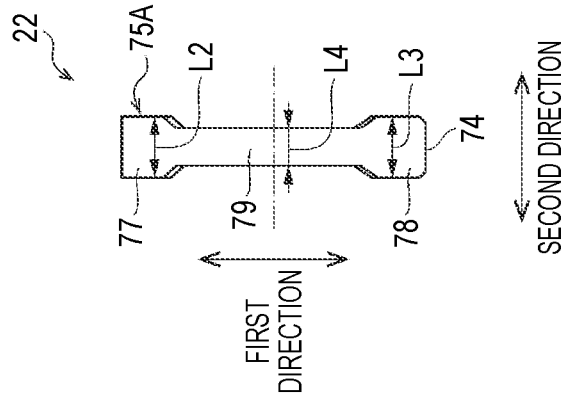

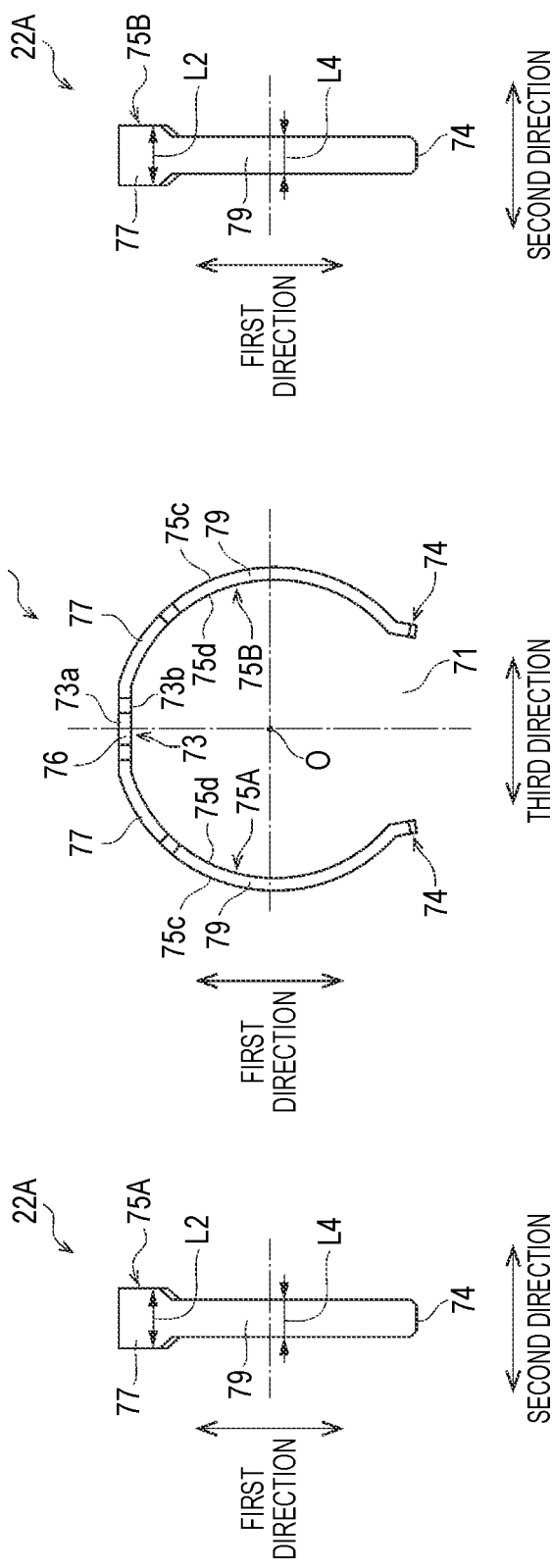

WORM REDUCER

CROSS REFERENCE TO RELATED APPLICATIONS

This application is a National Stage of International Application No. PCT/JP2022/023203 filed on Jun. 8, 2022 claiming priority from Japanese Patent Application No. 2021-106314 filed on Jun. 28, 2021, the disclosures of which are incorporated herein in their entirety by reference.

TECHNICAL FIELD

The present invention relates to a worm reducer incorporated in, for example, an electric power steering device.

BACKGROUND ART

Electric power steering devices that use an electric motor as an auxiliary power source are widely used as devices for reducing force required to operate a steering wheel when applying a steering angle to steered wheels of an automobile.

Electric power steering devices are roughly classified in structure depending on the attachment position of the electric motor. Specifically, various structures have been proposed such as a column assist type that applies auxiliary power to a steering shaft rotatably supported inside a steering column, a pinion assist type that applies auxiliary power to a pinion shaft that is an input shaft of a steering gear unit, and a dual pinion type in which the steering gear unit is provided with a pinion shaft separate from the pinion shaft that is the input shaft, and auxiliary power is applied to the separate pinion shaft.

In either structure, the auxiliary power of the electric motor is applied via a speed reducer to a shaft member that rotates or moves linearly by operating the steering wheel. As such a speed reducer, a worm reducer is widely used. A worm reducer that configures an electric power steering device includes a worm that is rotationally driven by an electric motor and a worm wheel that meshes with the worm.

FIG. 25 shows an example of a related-art structure of a worm reducer described in JP4381024B. A worm reducer 100 includes a housing 101, a worm wheel 102, and a worm 103.

The housing 101 includes a wheel accommodation portion 104 and a worm accommodation portion 105 of which a central axis is present in a twisted position with respect to a central axis of the wheel accommodation portion 104 and an axially intermediate portion opens into the wheel accommodation portion 104.

The worm wheel 102 has wheel teeth 106 on the outer circumferential surface thereof, and is supported and fixed coaxially with a rotary shaft 107 around the rotary shaft 107 that is rotatably supported inside the wheel accommodation portion 104.

The worm 103 has worm teeth 108 that mesh with the wheel teeth 106 on the outer circumferential surface of the axially intermediate portion. The worm 103 is rotatably supported inside the worm accommodation portion 105 by two ball bearings 109a and 109b at two positions in the axial direction with the worm teeth 108 in between. Of the two ball bearings 109a and 109b, an outer ring of the ball bearing 109a on a tip end side of the worm 103 (right side in FIG. 25) is press-fitted to a holder 110 that is internally fitted and fixed to the inside of a far end side part of the worm accommodation portion 105. An inner ring of the ball bearing 109a is externally fitted to a large diameter portion 111 provided at a part of the worm 103 positioned farther on the tip end side than the worm teeth 108 via a synthetic resin bush 112 by a clearance fit. That is, the inner ring of the ball bearing 109a is externally fitted to the bush 112, which is externally fitted to the large diameter portion 111 of the worm 103 with a clearance fit, without rattling. An outer ring of the ball bearing 109b on a base end side of the worm 103 (left side in FIG. 25) is internally fitted to the opening portion of the worm accommodation portion 105 with a clearance fit, and an inner ring of the ball bearing 109b is externally fitted to a base end portion of the worm 103. An output shaft of an electric motor 113 is connected to the base end portion of the worm 103 such that torque can be transmitted thereto. That is, the worm 103 can be rotationally driven by the electric motor 113.

In the worm reducer 100, unavoidable backlash is present at the meshing portion between the wheel teeth 106 and the worm teeth 108, based on dimensional errors and assembly errors of respective components configuring the worm reducer 100. Due to the presence of the backlash, when changing the rotation direction of the steering wheel, harsh rattling noise may occur at the meshing portion. In the shown example, the tip end portion of the worm 103 is elastically urged toward the worm wheel 102 to prevent the occurrence of such rattling noise.

That is, the base end portion of the worm 103 is supported by the ball bearing 109b having a radial clearance with respect to the worm accommodation portion 105 to be able to swing slightly and be displaced. An annular clearance is present over the entire circumference between the outer circumferential surface of the large diameter portion 111 of the worm 103 and the inner circumferential surface of the bush 112. A pad 114 is externally fitted to the tip end portion of the worm 103, and a torsion coil spring 115 is installed between the pad 114 and the holder 110. By the torsion coil spring 115 elastically pressing the pad 114 toward the worm wheel 102 in a first direction (up-down direction in FIG. 25), which is the direction in which the worm 103 moves toward and away from the worm wheel 102, the tip end portion of the worm 103 is elastically urged toward the worm wheel 102 (upper side in FIG. 25) in the first direction. As a result, backlash between the wheel teeth 106 and the worm teeth 108 is reduced, and the occurrence of rattling noise is prevented.

CITATION LIST

Patent Literature

[Patent Literature 1] JP4381024B

SUMMARY OF INVENTION

Technical Problem

In the structure described in JP4381024B, to make it possible to press the tip end portion of the worm 103 in a direction approaching the worm wheel 102, an annular clearance is present over the entire circumference between the outer circumferential surface of the large diameter portion 111 of the worm 103 and the inner circumferential surface of the bush 112. An annular clearance is present which is smaller than the annular clearance between the outer circumferential surface of the large diameter portion 111 of the worm 103 and the inner circumferential surface of the bush 112 and which is on the entire circumference between the tip end portion of the worm 103 and a through-hole of the pad 114. Therefore, when changing the rotation direction of the steering wheel, that is, when changing the rotation direction of the worm 103, in the reaction forces applied from the wheel teeth 106 to the worm teeth 108, there is a possibility that the direction of the component in a third direction (front-back direction in FIG. 25) that is orthogonal to both the first direction and a second direction (left-right direction in FIG. 25) which is the axial direction of the worm accommodation portion 105 changes, and the tip end portion of the worm 103 is vigorously displaced in the third direction. Therefore, there is room for improvement in terms of preventing the occurrence of abnormal noises such as rattling noises.

An object of the present invention is to provide a worm reducer in which, when the rotation direction of the worm changes, the tip end portion of the worm can be made difficult to displace in the third direction orthogonal to both the first direction that is the urging direction of the tip end portion and the second direction that is the axial direction of the worm accommodation portion.

Solution to Problem

The worm reducer of the present invention includes a housing, a worm wheel, a worm, a holder, a support bearing, a pad, and an elastic member.

The housing includes a wheel accommodation portion and a worm accommodation portion disposed in a twisted position with respect to the wheel accommodation portion and having an axially intermediate portion open to the wheel accommodation portion.

The worm wheel has wheel teeth on an outer circumferential surface thereof and is rotatably supported inside the wheel accommodation portion.

The worm has worm teeth that mesh with the wheel teeth on an outer circumferential surface thereof, and is rotatably supported inside the worm accommodation portion.

The holder is configured in an annular shape, a tip end portion of the worm is inserted therethrough radially inward, and the holder is internally fitted and fixed to the worm accommodation portion.

The support bearing is a rolling bearing having an inner ring and an outer ring, and is disposed between an outer circumferential surface of the tip end portion of the worm and an inner circumferential surface of the holder while a clearance in a radial direction is interposed between an inner circumferential surface of the inner ring and an outer circumferential surface of the tip end portion of the worm, or between an outer circumferential surface of the outer ring and an inner circumferential surface of the holder. A cylindrical bush may be disposed between the inner circumferential surface of the inner ring and the outer circumferential surface of the tip end portion of the worm, or between the outer circumferential surface of the outer ring and the inner circumferential surface of the holder.

The pad is disposed around the tip end portion of the worm at a location adjacent to the support bearing in the axial direction, and is used to press the tip end portion of the worm in a direction toward the worm wheel.

The elastic member is assembled to the holder and elastically urges the tip end portion of the worm toward the worm wheel via the pad.

The holder has two holder engagement portions at positions sandwiching the pad from both sides in a third direction orthogonal to both a first direction that is an urging direction of the elastic member and a second direction that is the axial direction of the worm accommodation portion.

The pad has two pad engagement portions which come into contact with the two holder engagement portions at both side portions in the third direction, and has a pad elastic pressing portion that applies a preload to a contact portion between the holder engagement portion and the pad engagement portion by elastically pressing a part of the holder toward the other side in the second direction. Displacement of the pad in the third direction with respect to the holder is regulated based on contact between the two holder engagement portions and the two pad engagement portions.

In the worm reducer according to an aspect of the present invention, the two holder engagement portions each have two holder inclined surfaces extending in the first direction and inclined toward each other toward one side in the second direction, and the two pad engagement portions have two pad inclined surfaces that are in surface contact with the two holder inclined surfaces.

In the worm reducer according to the aspect of the present invention, the pad elastic pressing portion is positioned farther on one side in the second direction than the two pad engagement portions, and include two pad elastic pressing plates each extending from a center portion of the pad in the third direction toward sides away from each other in the third direction, and a part of the holder that is elastically pressed toward the other side in the second direction from the two pad elastic pressing plates includes a holder pressed surface facing one side in the second direction.

In the worm reducer according to the aspect of the present invention, each of the two pad elastic pressing plates is provided with a protrusion extending in the first direction on a side surface on the other side in the second direction, and the tip end portion of the protrusion elastically presses the holder pressed surface toward the other side in the second direction.

In the worm reducer according to the aspect of the present invention, each of the two pad elastic pressing plates has a slit that penetrates in the second direction and extends in the first direction at an end portion on the center side of the pad in the third direction.

In the worm reducer according to the aspect of the present invention, the elastic member includes a plate spring.

The holder may include a tubular portion that is internally fitted to the inner circumferential surface of the worm accommodation portion and on which the support bearing is disposed radially inside, a side plate portion extending radially inward from the end portion on one side in the second direction of the tubular portion, and two guide portions extending toward one side in the second direction from two locations spaced apart in the third direction in the radially inner end portion of the side plate portion. The two holder inclined surfaces may be provided on the inner surfaces of the two guide portions that face each other in the third direction, and the holder pressed surfaces may be provided on each of one side end surface of the two guide portions in the second direction.

Here, a configuration may be adopted in which the pad has a base portion disposed between the two guide portions, and a through-hole which penetrates the base portion in the second direction and into which the tip end portion of the worm is inserted, the two pad inclined surfaces are provided on both side portions of the base portion in the third direction, and the two pad elastic pressing plates are connected to a part of the base portion that protrudes from between the two guide portions to one side in the second direction.

The holder may include a connection portion that connects end portions of the two guide portions on the side close to the worm wheel in the first direction.

A configuration may be adopted in which the elastic member is configured with a C-shaped cylindrical plate spring having a discontinuous portion at one location in the circumferential direction, and is assembled to the holder to be externally fitted to the two guide portions and the base portion.

Advantageous Effects of Invention

According to the worm reducer according to an aspect of the present invention, when the rotation direction of the worm changes, the tip end portion of the worm can be made difficult to displace in the third direction orthogonal to both the first direction that is the urging direction of the tip end portion and the second direction that is the axial direction of the worm accommodation portion.

BRIEF DESCRIPTION OF DRAWINGS

FIG. 14A is a diagram of the holder configuring the urging mechanism according to the first example viewed from the right side of FIG. 4, FIG. 14B is a diagram of the holder viewed from the left side of FIG. 14A, FIG. 14C is a diagram of the holder viewed from above of FIG. 14A, and FIG. 14D is a diagram of the holder viewed from the left side of FIG. 4.

FIG. 15A is a diagram of the pad configuring the urging mechanism according to the first example viewed from the right side of FIG. 4, FIG. 15B is a diagram of the pad viewed from the left side of FIG. 15A, FIG. 15C is a diagram of the pad viewed from above of FIG. 15A, and FIG. 15D is a diagram of the pad viewed from the left side of FIG. 4.

FIGS. 21A to 21D are diagrams showing the elastic member according to the present embodiment, with FIG. 21A showing a view from one side in the third direction, FIG. 21B showing a view in the second direction, FIG. 21C showing a view from the other side in the third direction, and FIG. 21D showing a view in the first direction.

FIGS. 23A to 23D are diagrams showing an elastic member according to a comparative example, with FIG. 23A showing a view from one side in the third direction. FIG. 23B showing a view in the second direction, FIG. 23C showing a view from the other side in the third direction, and FIG. 23D showing a view in the first direction.

FIG. 24B showing a view in the first direction, and FIG. 24C showing a view in the third direction.

DESCRIPTION OF EMBODIMENTS

First Example of Embodiment

A first example of an embodiment of the present invention will be described using FIGS. 1 to 16. Note that in the present example, a case will be described in which a worm reducer according to an aspect of the present invention is applied to a pinion assist type electric power steering device. However, the worm reducer of the present invention is widely applicable to column assist type, dual pinion type electric power steering devices, and various mechanical devices other than electric power steering devices.

Figure 1:
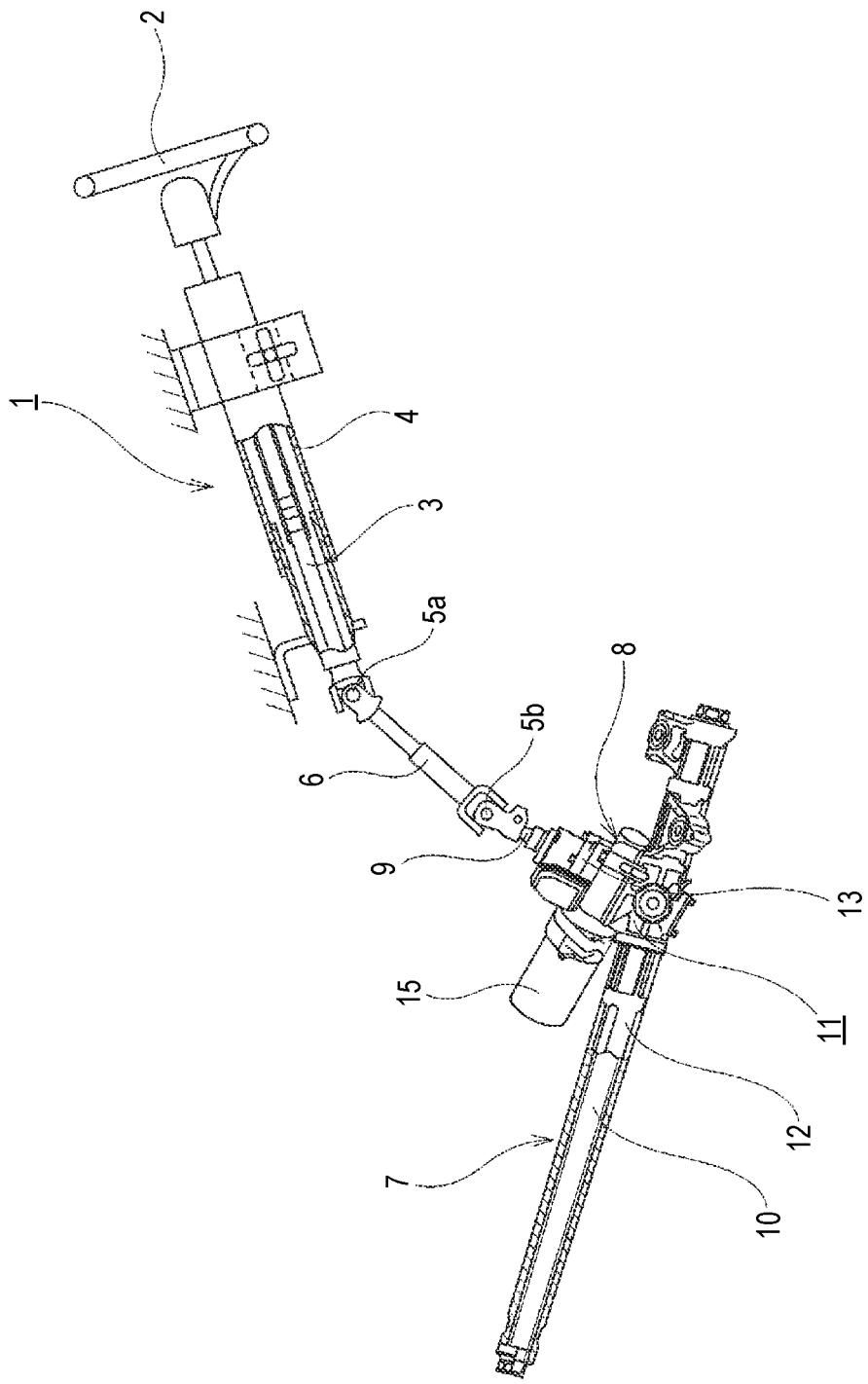
FIG. 1 is a diagram showing an electric power steering device incorporating a worm reducer according to a first example of an embodiment of the present invention.
Figure 2:
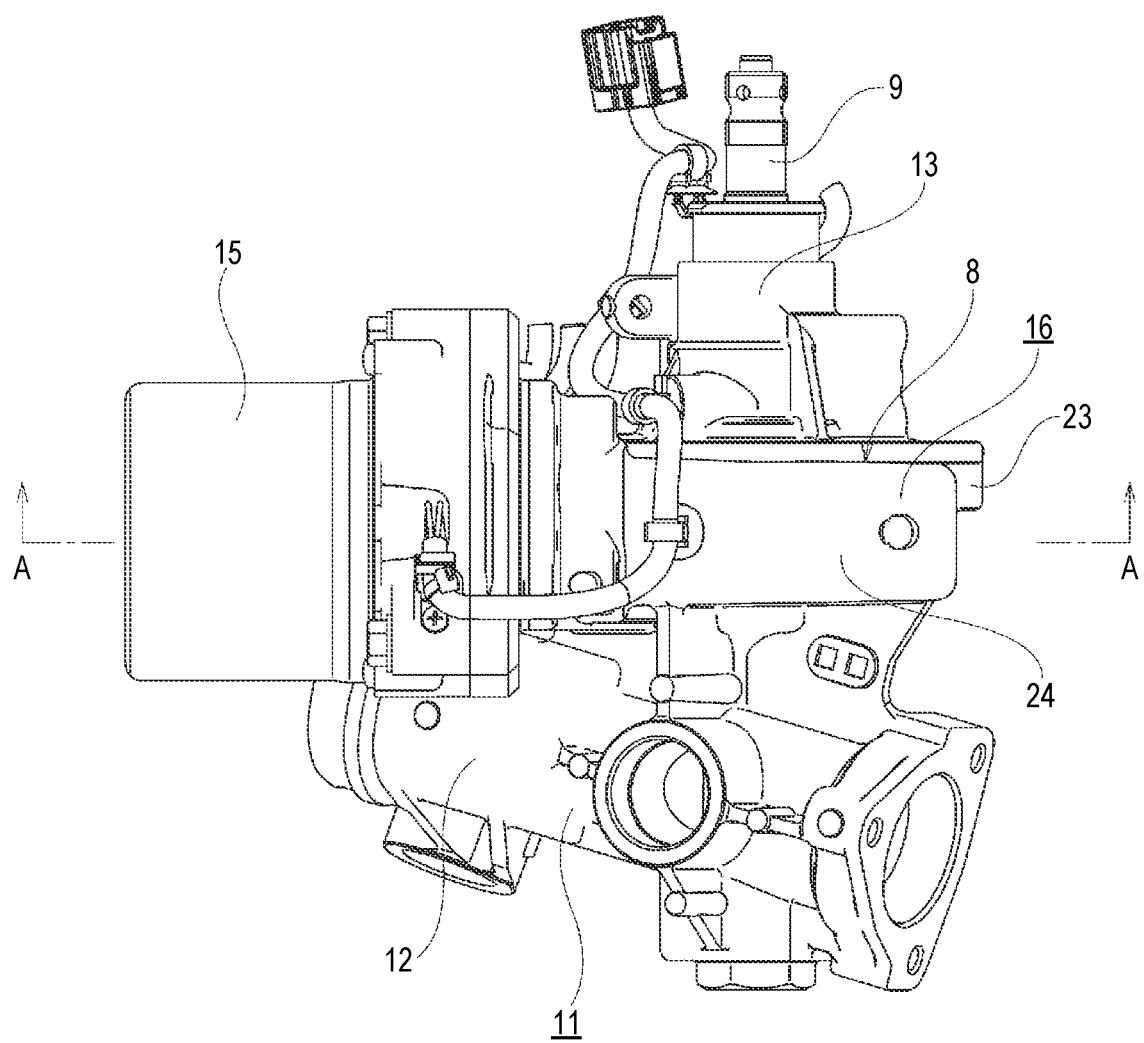
FIG. 2 is a diagram showing a part of the electric power steering device incorporating the worm reducer according to the first example of the embodiment of the present invention.
Figure 3:
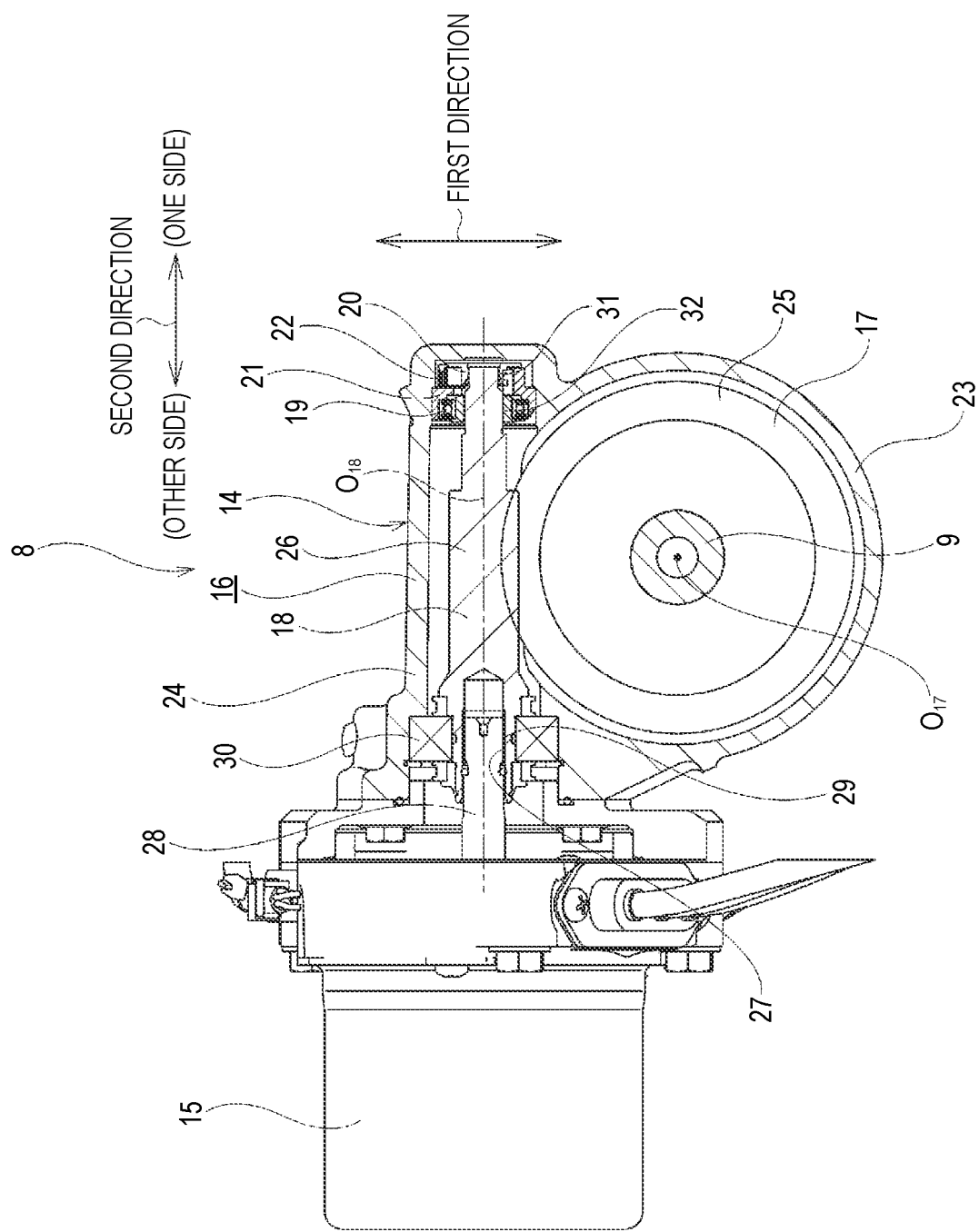
FIG. 3 is a sectional view taken along line A-A in FIG. 2.
Figure 4:
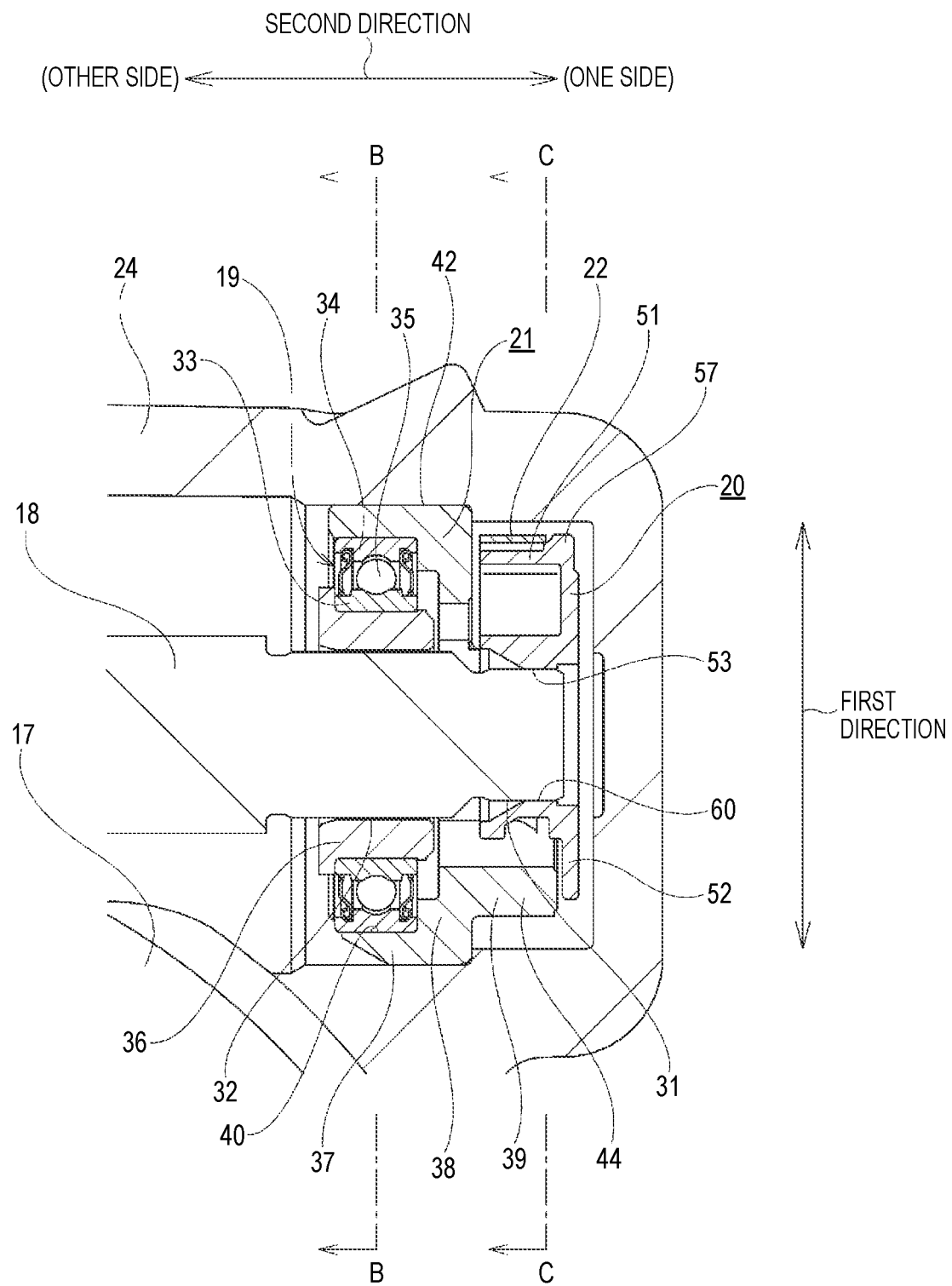
FIG. 4 is an enlarged view of an upper right portion of FIG. 3.
Figure 5:
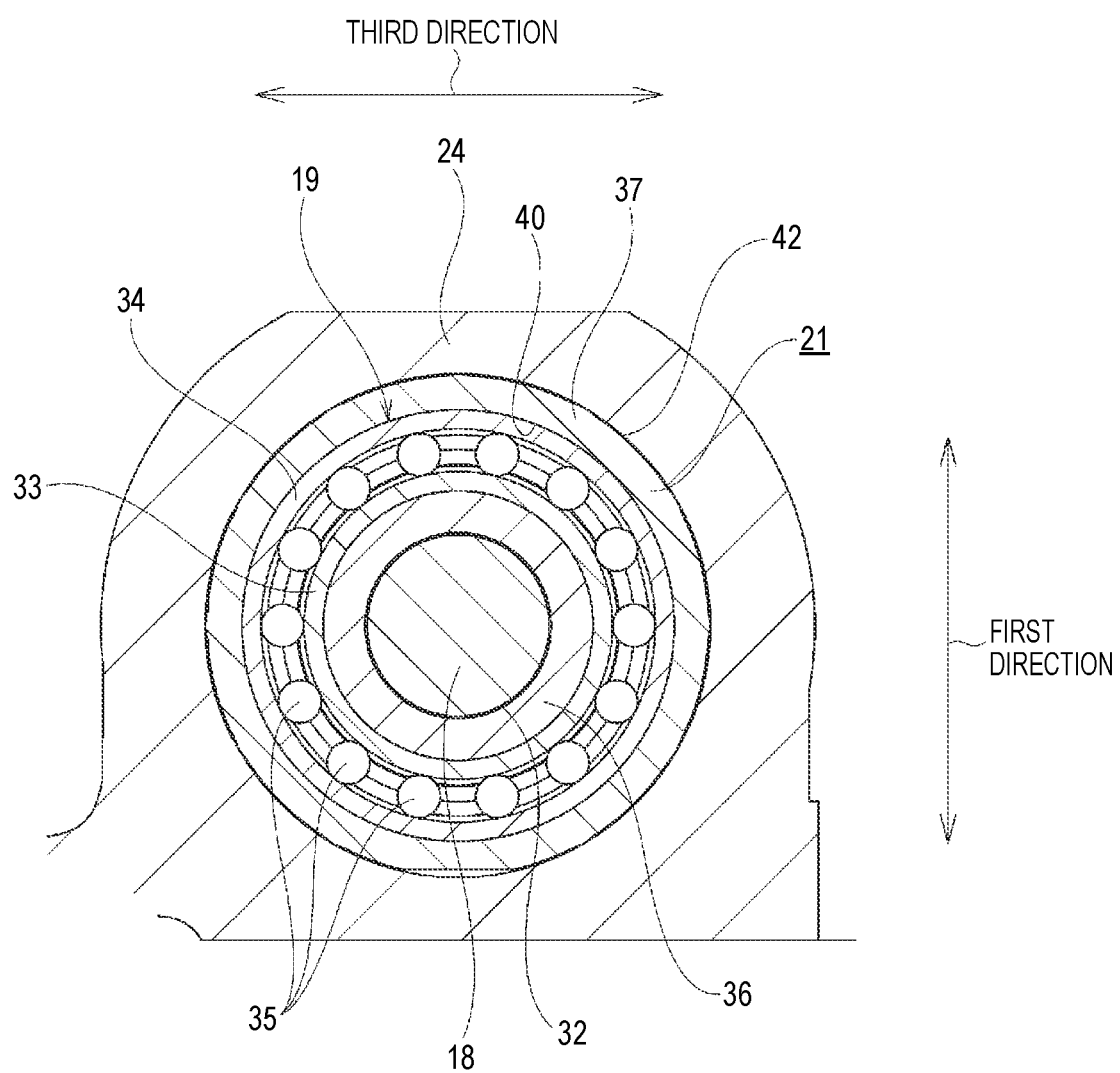
FIG. 5 is a sectional view taken along line B-B in FIG. 4.

FIG. 1 shows a pinion assist type electric power steering device 1 incorporating a worm reducer of the present example. The electric power steering device 1 includes a steering wheel 2, a steering shaft 3, a steering column 4, a pair of universal joints 5a and 5b, an intermediate shaft 6, a steering gear unit 7, and an electric assist device 8.

The steering wheel 2 is supported and fixed to the rear end portion of the steering shaft 3. The steering shaft 3 is rotatably supported inside the steering column 4 supported by a vehicle body. The front end portion of the steering shaft 3 is connected to a pinion shaft 9 of the steering gear unit 7 via the universal joint 5a on the rear side, the intermediate shaft 6, and the universal joint 5b on the front side. Therefore, when the driver rotates the steering wheel 2, the rotation of the steering wheel 2 is transmitted to the pinion shaft 9 via the steering shaft 3, the pair of universal joints 5a and 5b, and the intermediate shaft 6. The rotation of the pinion shaft 9 is converted into a linear motion of a rack shaft 10 of the steering gear unit 7, which meshes with the pinion shaft 9. As a result, a steering angle corresponding to the amount of rotational operation of the steering wheel 2 is applied to a pair of steered wheels. The electric assist device 8 applies auxiliary power generated using an electric motor 15 as a power source to the pinion shaft 9. As a result, the force required for the driver to rotate the steering wheel 2 is reduced.

The steering gear unit 7 includes a housing 11 supported and fixed to the vehicle body, the rack shaft 10, and the pinion shaft 9. The housing 11 includes a rack accommodation portion 12 extending in the vehicle width direction, and a pinion accommodation portion 13 connected to one axial side portion (the right side portion in FIG. 1) of the rack accommodation portion 12. A central axis of the pinion accommodation portion 13 is present in a twisted position with respect to a central axis of the rack accommodation portion 12. An inner space of the pinion accommodation portion 13 communicates with an inner space of the rack accommodation portion 12. The rack shaft 10 is supported inside the rack accommodation portion 12 to be movable only in the axial direction (vehicle width direction). The pinion shaft 9 is supported inside the pinion accommodation portion 13 only to be rotatable. The pinion shaft 9 has pinion teeth on the outer circumferential surface of a front half portion (not shown) (the lower half portion in FIG. 2) disposed inside the pinion accommodation portion 13. A base end portion (the upper end portion in FIG. 2) of the pinion shaft 9 protrudes to the outside of the housing 11 and is connected to the universal joint 5b on the front side. The rack shaft 10 has rack teeth that mesh with the pinion teeth of the pinion shaft 9 at a circumferential part of the outer circumferential surface of one axial side portion (not shown) (the right side portion in FIG. 1) disposed inside the rack accommodation portion 12.

The electric assist device 8 includes a worm reducer 14 and the electric motor 15. The electric assist device 8 is configured to reduce the rotation of the electric motor 15 using the worm reducer 14 and transmit the rotation to the pinion shaft 9.

The worm reducer 14 includes a housing 16, a worm wheel 17, a worm 18, a holder 21, a support bearing 19, a pad 20, and an elastic member 22.

The housing 16 includes a wheel accommodation portion 23 and a worm accommodation portion 24 disposed in a twisted position with respect to the wheel accommodation portion 23 and having an axially intermediate portion open to the wheel accommodation portion 23.

That is, a central axis of the wheel accommodation portion 23 and a central axis of the worm accommodation portion 24 are disposed in twisted positions with respect to each other. The axially intermediate portion of the worm accommodation portion 24 is integrally connected to one location in the circumferential direction of the radially outer end portion of the wheel accommodation portion 23, and through the connected part, an inner space of the worm accommodation portion 24 communicates with an inner space of the wheel accommodation portion 23. In the present example, the worm accommodation portion 24 has a cylindrical shape with a bottom, and specifically, the tip end in the axial direction (the right end in FIG. 3) is closed and the base end in the axial direction (the left end in FIG. 3) is open.

In the present example, the wheel accommodation portion 23 is coaxially and integrally connected to an axially intermediate portion of the pinion accommodation portion 13 that configures the housing 11 of the steering gear unit 7.

The inner space of the wheel accommodation portion 23 communicates with the inner space of the pinion accommodation portion 13.

The worm wheel 17 has wheel teeth 25 on the outer circumferential surface thereof and is rotatably supported inside the wheel accommodation portion 23. In the present example, the worm wheel 17 is externally fitted and fixed to an axially intermediate portion of the pinion shaft 9.

The worm 18 has worm teeth 26 that meshes with the wheel teeth 25 at an axially intermediate portion on the outer circumferential surface, and is rotatably supported inside the worm accommodation portion 24.

In the present example, the base end portion (the left end portion in FIG. 3) of the worm 18 is supported with respect to the worm accommodation portion 24 to be able to swing slightly and be displaced, and is connected to an output shaft 28 of the electric motor 15 to be able to transmit torque.

Therefore, in the present example, the worm 18 has a female spline portion 27 on the inner circumferential surface of the base end portion. The electric motor 15 is coupled and fixed to the axial base end portion of the worm accommodation portion 24 with screw clamps while the output shaft 28 is disposed coaxially with the worm accommodation portion 24. The female spline portion 27 of the worm 18 and a male spline portion 29 provided on the outer circumferential surface of the output shaft 28 of the electric motor 15 are spline-engaged. Thereby, the base end portion of the worm 18 and the output shaft 28 of the electric motor 15 are connected such that torque can be transmitted and the worm 18 can slightly swing and be displaced. The base end portion of the worm 18 is supported by a ball bearing 30 having a radial clearance with respect to the worm accommodation portion 24 to be able to swing slightly and be displaced.

In the present example, the outer circumferential surface of the tip end portion of the worm 18 is configured with a stepped cylindrical surface. That is, the outer circumferential surface of the tip end portion of the worm 18 has a small diameter cylindrical surface portion 31 configuring the tip end side portion and a large diameter cylindrical surface portion 32 configuring the base end side portion having a larger diameter than the small diameter cylindrical surface portion 31.

In the worm reducer 14 of the present example, a central axis $O_{17}$ of the worm wheel 17 and a central axis (the central axis of the output shaft 28 of the electric motor 15) $O_{18}$ of the worm 18 are orthogonal to each other when viewed in a first direction (the up-down direction in FIGS. 3 and 4) which will be described later. However, the present invention can also be applied to an oblique intersection type worm reducer in which the central axis $O_{17}$ of the worm wheel 17 and the central axis (the central axis of the output shaft 28 of the electric motor 15) $O_{18}$ of the worm 18 obliquely intersect each other, that is, an acute angle is formed, when viewed in the first direction.

In the worm reducer 14 of the present example, as shown in FIGS. 3 to 6, the holder 21, the support bearing 19, the pad 20, and the elastic member 22 are disposed between the outer circumferential surface of the tip end portion of the worm 18 and the inner circumferential surface of the tip end portion of the worm accommodation portion 24.

Specifically, the holder 21 is configured in an annular shape, the tip end portion of the worm 18 is inserted therethrough radially inward, and the holder 21 is internally fitted and fixed to the worm accommodation portion 24. The support bearing 19 is a rolling bearing having an inner ring 33 and an outer ring 34, and is disposed between the outer circumferential surface of the tip end portion of the worm 18 and the inner circumferential surface of the holder 21 while a clearance in the radial direction is interposed between the inner circumferential surface of the inner ring 33 and the outer circumferential surface of the tip end portion of the worm 18. The pad 20 is disposed around the tip end portion of the worm 18 at a location adjacent to the support bearing 19 in the axial direction, and is used to press the tip end portion of the worm 18 in a direction toward the worm wheel. The elastic member 22 is assembled to the holder 21 and elastically urges the tip end portion of the worm 18 toward the worm wheel 17 (the lower side in FIGS. 3 and 4) via the pad 20. Accordingly, backlash at the meshing portion between the wheel teeth 25 and the worm teeth 26 is reduced.

Note that, when implementing the present invention, the positional relationship between the support bearing and the pad in a second direction (the left-right direction in FIGS. 3 and 4) can be reversed from that in the present example. For example, a configuration can also be adopted in which an assembly of the holder 21, the support bearing 19, the pad 20, and the elastic member 22 is disposed in the opposite direction to that in the present example in the second direction between the outer circumferential surface of the tip end portion of the worm 18 and the inner circumferential surface of the tip end portion of the worm accommodation portion 24. Note that, when such a configuration is adopted, one side in the second direction is the left side in FIGS. 3 and 4.

The holder 21 has two holder inclined surfaces 45 (refer to FIGS. 8, 12, 14A to 14D, and the like), which are two holder engagement portions at a position where the pad 20 is sandwiched from both sides in a third direction (the front-back direction in FIGS. 3 and 4) orthogonal to both the first direction (the up-down direction in FIGS. 3 and 4) that is the urging direction of the elastic member 22 and the second direction (the left-right direction in FIGS. 3 and 4) that is the axial direction of the worm accommodation portion 24. The two holder inclined surfaces 45 each extend in the first direction, and are inclined in a direction toward each other toward one side (in the present example, the right side in FIGS. 3 and 4) in the second direction. When implementing the present invention, the direction of inclination of the two holder inclined surfaces in the second direction can also be made to be the opposite direction to that of the present example. Then, one side in the second direction is the left side in FIGS. 3 and 4. Note that the holder 21 is preferably made of a material having sufficient strength and rigidity, such as a metal material.

More specifically, in the present example, as shown in FIGS. 4, 8, and 14A to 14D, the holder 21 includes a cylindrical tubular portion 37, an annular side plate portion 38 extending radially inward from the end portion on one side in the second direction of the tubular portion 37, and a substantially U-shaped protrusion portion 39 extending from the radially inner end portion of the side plate portion 38 toward one side in the second direction.

The tubular portion 37 is a part which is internally fitted to the inner circumferential surface of the worm accommodation portion 24 and on which the support bearing 19 is disposed on the radially inner side. In the present example, the tubular portion 37 has a bearing holding surface 40 at the end portion on the other side (the left side in FIGS. 3 and 4) in the second direction and on the inner circumferential surface of the intermediate portion. The tubular portion 37 has a fitting surface 42 formed by arranging protrusions 41 having triangular cross-sections at a plurality of locations in the circumferential direction on the outer circumferential surface. In the present example, to internally fit and fix the holder 21 to the inner circumferential surface of the worm accommodation portion 24, the fitting surface 42 of the tubular portion 37 is internally fitted to the inner circumferential surface of the worm accommodation portion 24 by a tight fit.

In the present example, the inner circumferential surface 61 of the side plate portion 38 has recess portions 62 recessed toward both sides in the third direction on both side parts in the third direction, as shown in FIG. 14D. The bottom surface of the recess portion 62 is configured by a plane orthogonal to the third direction. A part of the inner circumferential surface 61 of the side plate portion 38 that is removed from the two recess portions 62, that is, both side parts in the first direction, is configured with a cylindrical surface centered on the central axis of the holder 21.

Figure 8:
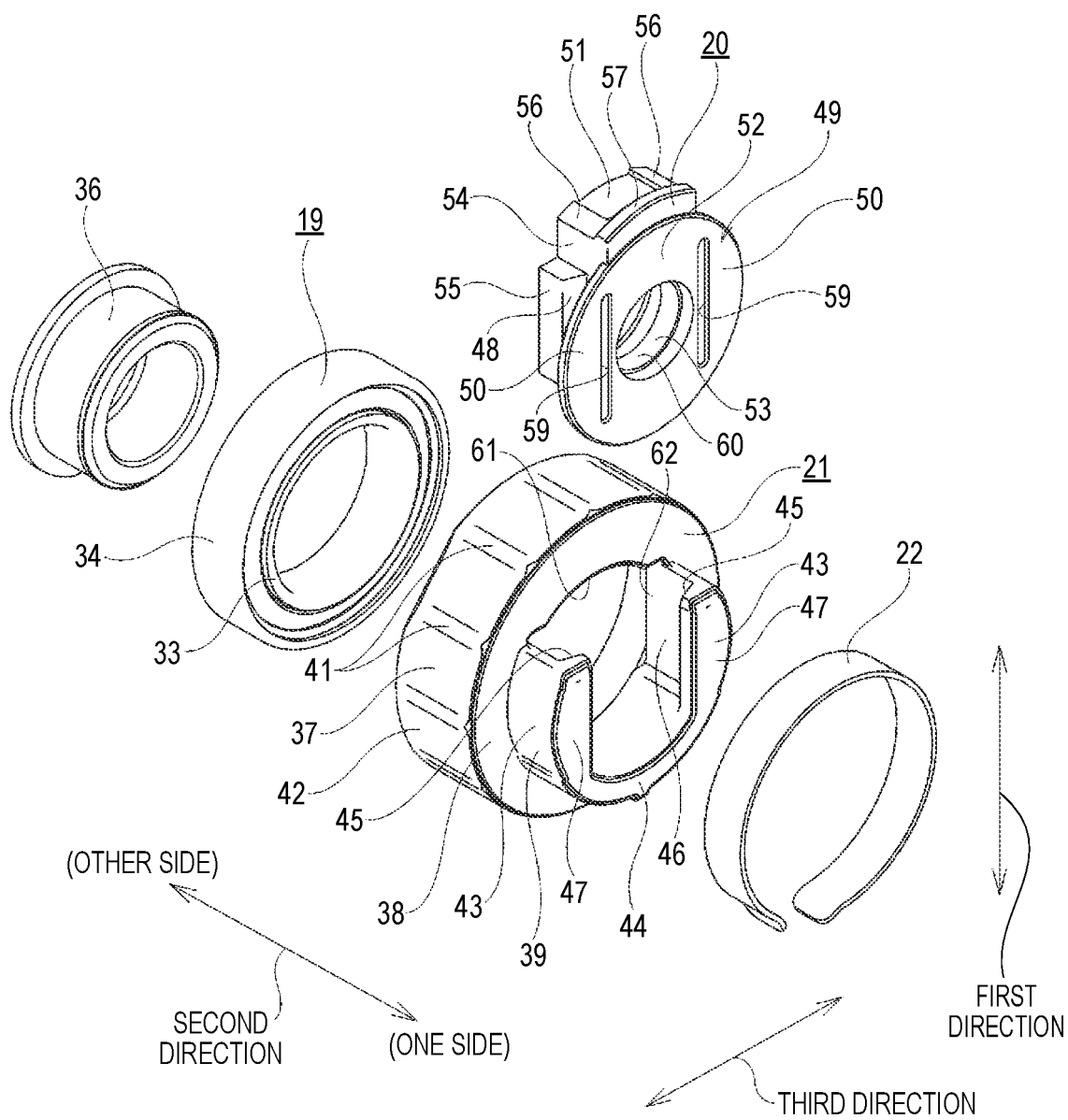
FIG. 8 is an exploded perspective view of the urging mechanism according to the first example.
Figure 9:
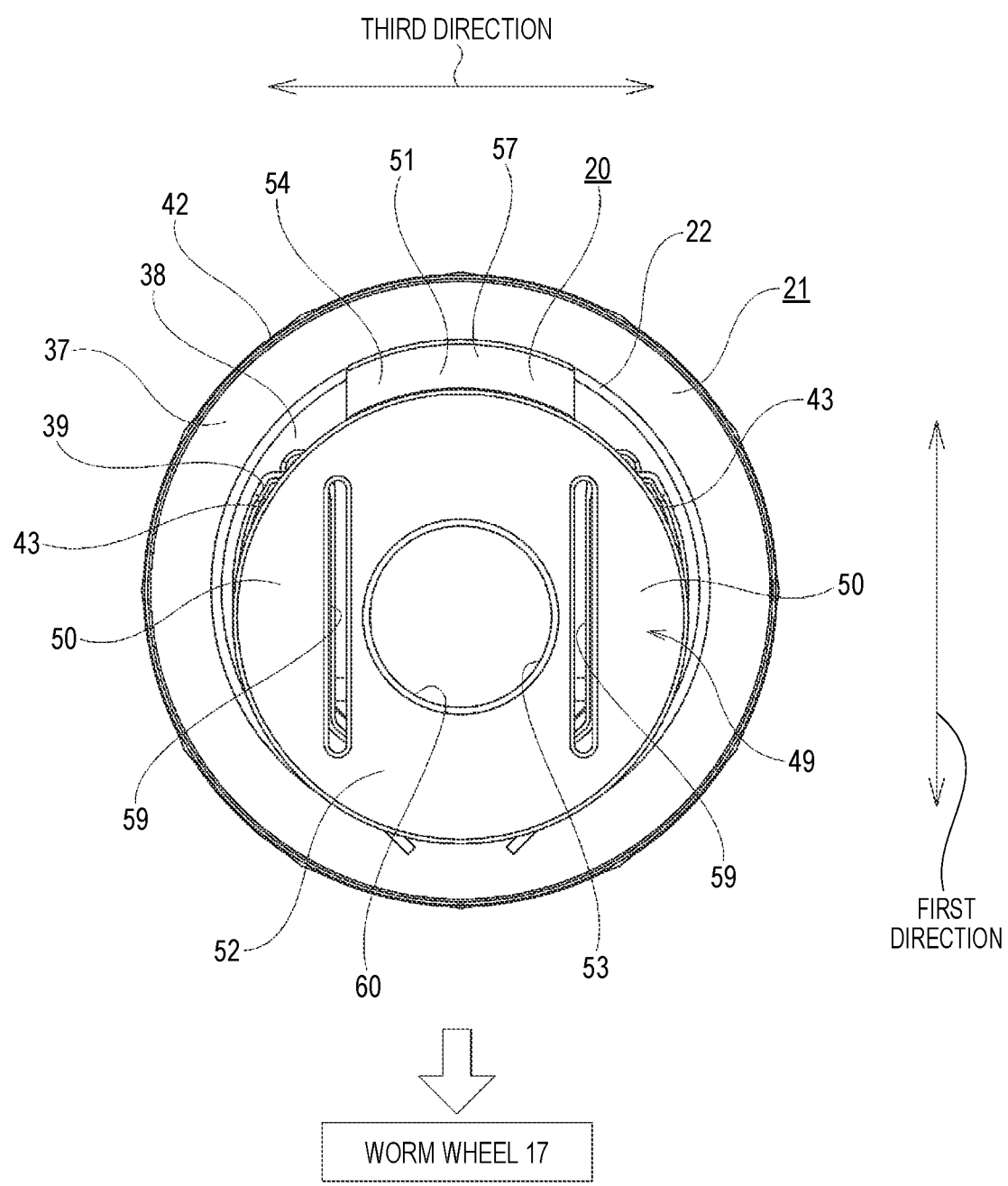
FIG. 9 is a diagram of the urging mechanism according to the first example viewed from the right side of FIG. 4.
Figure 10:
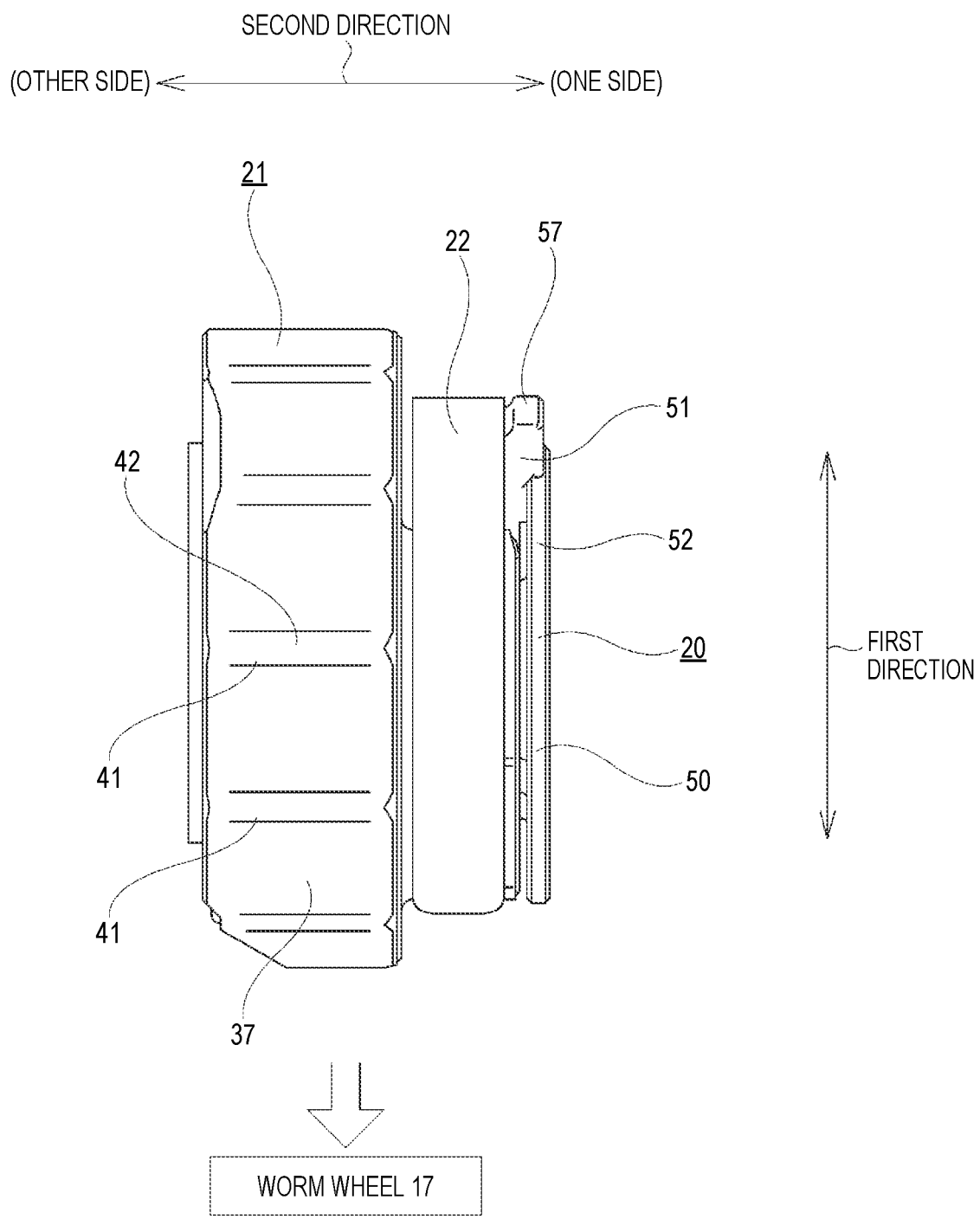
FIG. 10 is a diagram of the urging mechanism according to the first example viewed from the left side of FIG. 9.
Figure 11:
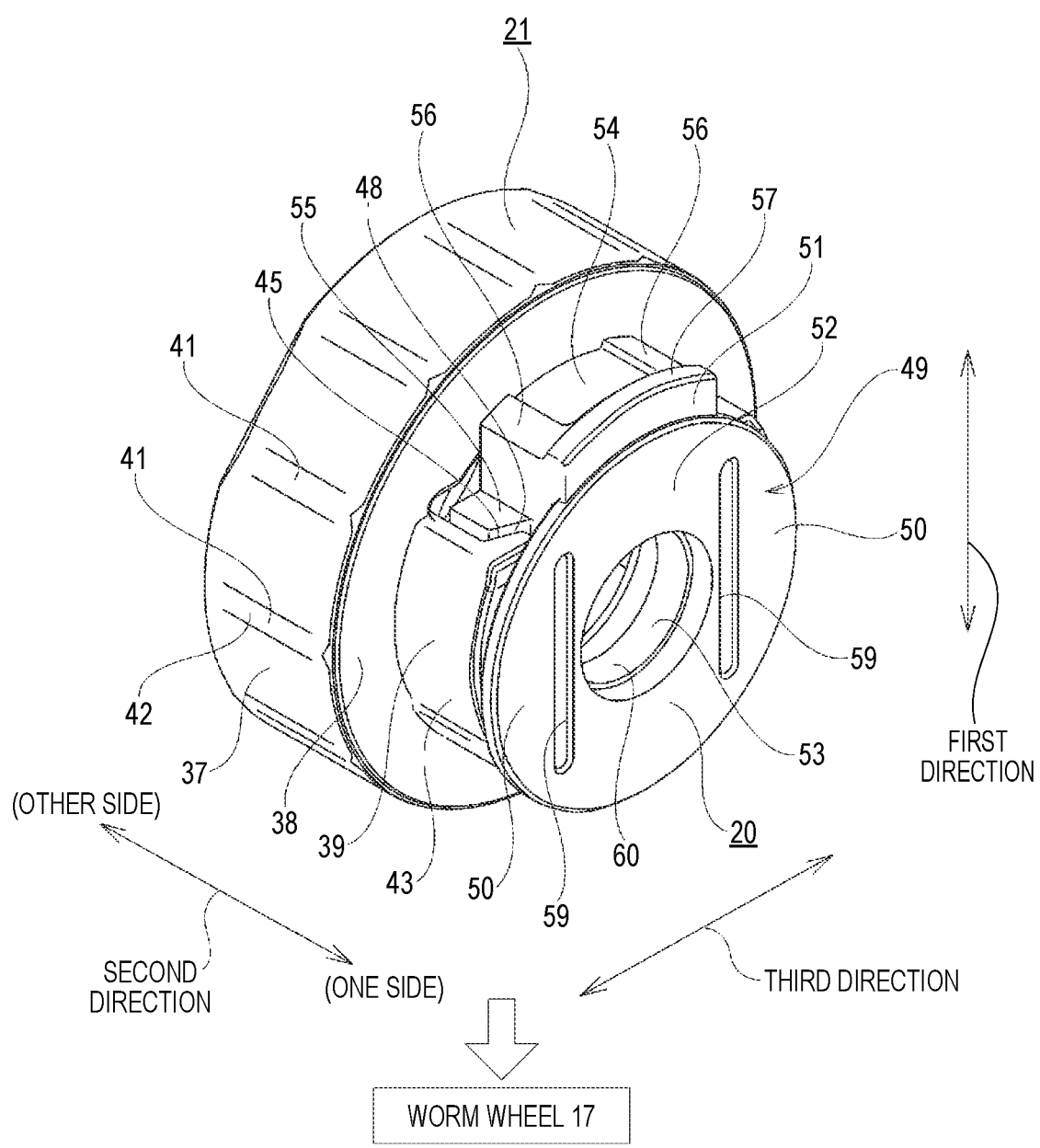
FIG. 11 is a perspective view showing the urging mechanism according to the first example with a plate spring removed.

In the present example, the protrusion portion 39 protrudes toward one side in the second direction from the part excluding the end portion of the radially inner end portion of the side plate portion 38 on the side far from the worm wheel 17 in the first direction. The protrusion portion 39 includes two guide portions 43 and a connection portion 44. The two guide portions 43 configure the end portions of the protrusion portion 39 on both sides in the third direction. That is, as shown in FIGS. 8, 14A, and 14D, the two guide portions 43 extend toward one side in the second direction from two locations of the radially inner end portion of the side plate portion 38 spaced apart in the third direction, specifically, the same circumferential locations as the two recess portions 62. The two guide portions 43 have a shape extending in the first direction. The connection portion 44 configures an end portion of the protrusion portion 39 on the side close to the worm wheel 17 in the first direction. That is, the connection portion 44 extends from the end portion of the radially inner end portion of the side plate portion 38 on the side close to the worm wheel 17 in the first direction toward one side in the second direction, and connects the end portion of the two guide portions 43 on the side close to the worm wheel 17 in the first direction. The connection portion 44 has a partially cylindrical shape centered on the central axis of the holder 21. Note that, when the holder has sufficient strength to prevent deformation of the two guide portions, the connection portion can be omitted.

The two holder inclined surfaces 45 configuring the holder 21 are provided on an inner surface 46 of the two guide portions 43, which are side surfaces facing each other in the third direction. In the present example, each of the inner surfaces 46 of the two guide portions 43 has a crank shape having a stepped surface (holder inclined surface 45) at the intermediate portion in the second direction, as shown in FIG. 14C, when viewed in the first direction. That is, the two holder inclined surfaces 45 are provided at an intermediate portion of the inner surface 46 of the two guide portions 43 in the second direction, more specifically, at one side part of the intermediate portion in the second direction. The two holder inclined surfaces 45 are inclined toward each other toward one side in the second direction. On the inner surfaces 46 of the two guide portions 43, each of the part positioned on one side of the two holder inclined surfaces 45 in the second direction, and the part positioned on the other side of the two holder inclined surfaces 45 in the second direction is configured with a plane orthogonal to the third direction. Therefore, the interval between the inner surfaces 46 of the two guide portions 43 is narrower than the part positioned on one side of the two holder inclined surfaces 45 in the second direction and the part positioned on the other side of the two holder inclined surfaces 45 in the second direction.

When implementing the present invention, an inclination angle θ of the holder inclined surface 45 with respect to the second direction can be set to any value in the range of 0°<θ<90° but is set to, preferably, 200 or more and 800 or less, and more preferably, 30° or more and 700 or less. In the present example, the inclination angle θ is 70°.

Each of the two guide portions 43 has a holder pressed surface 47 on a tip end surface that is an end surface on one side in the second direction. That is, the two holder pressed surfaces 47 face one side in the second direction. In the present example, the two holder pressed surfaces 47 and the tip end surface, which is an end surface of the connection portion 44 on one side in the second direction, are continuous with each other and are on the same virtual plane orthogonal to the second direction.

In the present example, the support bearing 19 is configured with a ball bearing. That is, the support bearing 19 includes the inner ring 33 having an inner ring raceway on the outer circumferential surface thereof, an outer ring 34 having an outer ring raceway on the inner circumferential surface thereof, and a plurality of balls 35, each of which is a rolling element disposed between the inner ring raceway and the outer ring raceway. However, when implementing the present invention, a rolling bearing such as a cylindrical roller bearing of which rolling elements are cylindrical rollers, or a tapered roller bearing of which rolling elements are tapered rollers, can also be used as the support bearing.

In the present example, a radial clearance is interposed between the inner circumferential surface of the inner ring 33 and the outer circumferential surface of the tip end portion of the worm 18. In the present example, a cylindrical bush 36 is disposed between the inner circumferential surface of the inner ring 33 and the outer circumferential surface of the tip end portion of the worm 18. Specifically, the inner ring 33 is externally fitted to the outer circumferential surface of the bush 36 by a tight fit, and the bush 36 is externally fitted to the large diameter cylindrical surface portion 32 of the worm 18 by a clearance fit. Note that the bush 36 is a member for ensuring slidability and/or cushioning performance with respect to the outer circumferential surface of the tip end portion of the worm 18. Preferably, the bush 36 is made of synthetic resin, a light alloy such as an aluminum alloy, or the like, which are materials that have a small coefficient of friction with respect to the metal material that configures the worm 18.

In the present example, the outer ring 34 is internally fitted to the bearing holding surface 40 of the holder 21 with a clearance fit. That is, the outer ring 34 is internally fitted and fixed to the holder 21.

In the present example, the tip end portion of the worm 18 can be displaced in the first direction (the up-down direction in FIGS. 3 and 4) that is the urging direction of the elastic member 22, based on the radial clearance that is present between the inner circumferential surface of the inner ring 33 and the outer circumferential surface of the tip end portion of the worm 18, specifically, and the annular clearance that is present between the inner circumferential surface of the bush 36 and the large diameter cylindrical surface portion 32.

When implementing the present invention, the inner ring of the support bearing can be externally fitted and fixed to the tip end portion of the worm, and the radial clearance can be interposed between the outer circumferential surface of the outer ring of the support bearing and the inner circumferential surface of the holder, that is, the tip end portion of the worm can also be displaced in the first direction based on the radial clearance. Here, a cylindrical bush can be disposed between the outer circumferential surface of the outer ring and the inner circumferential surface of the holder, specifically, for example, the outer ring can be internally fitted to the inner circumferential surface of the bush by a tight fit, and the outer circumferential surface of the bush can also be internally fitted to the inner circumferential surface of the holder with a clearance fit. Here, the bush is used as a member for ensuring slidability and/or cushioning performance with respect to the inner circumferential surface of the holder. However, when implementing the present invention, the bush can be omitted.

As shown in FIGS. 8, 12, 13, 15A to 15D, and 16, the pad 20 has two pad inclined surfaces 48 which are two pad engagement portions that come into contact with the two holder inclined surfaces 45 at both side portions in the third direction, and a pad elastic pressing portion 49 that applies a preload to the contact portion between the holder inclined surface 45 and the pad inclined surface 48 by elastically pressing a part of the holder 21 toward the other side in the second direction. In the present example, the two pad inclined surfaces 48 are in surface contact with the two holder inclined surfaces 45, specifically, the two pad inclined surfaces 48 are inclined in the same direction and at the same angle as the two holder inclined surfaces 45 (refer to FIG. 13). In the present example, the parts of the holder 21 that are elastically pressed toward the other side in the second direction by the pad elastic pressing portion 49 are the two holder pressed surfaces 47.

However, when implementing the present invention, some of the holders can be selected freely. For example, an end surface on one side in the second direction of the side plate portion configuring the holder is set as a part of the holder (holder pressed surface), and the part of the holder can also be elastically pressed toward the other side in the second direction by the pad elastic pressing portion provided at the base portion of the pad. Note that, preferably, the pad 20 is made of synthetic resin, a light alloy such as an aluminum alloy, or the like, which are materials that have a small coefficient of friction with respect to the metal material that configures the worm 18.

In the present example, the pad elastic pressing portion 49 is positioned farther on one side in the second direction than the two pad inclined surfaces 48, and are configured with two pad elastic pressing plates 50 each extending from the center portion of the pad 20 in the third direction toward sides away from each other in the third direction.

More specifically, in the present example, the pad 20 includes a base portion 51 disposed between the two guide portions 43, and a through-hole 53 which penetrates the base portion 51 in the second direction and into which the tip end portion of the worm 18 is inserted, two pad inclined surfaces 48 are provided at both side portions of the base portion 51 in the third direction, and a flat plate portion 52 including the two pad elastic pressing plates 50 is connected to a part of the base portion 51 that protrudes from between the two guide portions 43 to one side in the second direction.

The base portion 51 includes a base main body 54 and two base projection portions 55.

The base main body 54 extends in the first direction and has a substantially rectangular end surface shape. The through-hole 53 has a circular opening shape, and penetrates, in the second direction, a half portion of the base main body 54 on the side close to the worm wheel 17 in the first direction. The base main body 54 has two pressed portions 56 at both end portions in the third direction of a part on the other side in the second direction, at the end portion far from the worm wheel 17 in the first direction. Each of the two pressed portions 56 is configured with a partial cylindrical surface centered on the central axis of the through-hole 53. The base main body 54 has a flange portion 57 that projects toward a side farther from the worm wheel 17 than the two pressed portions 56 in the first direction on one side part in the second direction, at the end portion far from the worm wheel 17 in the first direction.

The two base projection portions 55 protrude toward the sides away from each other in the third direction from a part of the base main body 54 on the side close to the worm wheel 17 in the first direction in the half portion on the other side in the second direction. Each of the two base projection portions 55 extends in the first direction.

In the present example, the two pad inclined surfaces 48 configuring the pad 20 are provided on a side surface of the two base projection portions 55 on one side in the second direction. The two pad inclined surfaces 48 are inclined toward each other toward one side in the second direction. The inclination angle θ of the pad inclined surface 48 with respect to the second direction is the same as the inclination angle θ of the holder inclined surface 45 with respect to the second direction.

The flat plate portion 52 is integrally connected to an end portion of the base main body 54 on one side in the second direction, and has a circular outer circumferential shape when viewed from one side in the second direction. The through-hole 53 penetrates the radially center portion of the flat plate portion 52 in the second direction. Therefore, the flat plate portion 52 has a circular flat plate shape centered on the central axis of the through-hole 53. The outer diameter dimension of the flat plate portion 52 is larger than the width dimension of the base main body 54 in the third direction. The end portions of the flat plate portion 52 on both sides in the third direction project toward both sides in the third direction from the base main body 54. The end portion of the flat plate portion 52 close to the worm wheel 17 in the first direction projects toward a side closer to the worm wheel 17 than the base main body 54 in the first direction. The end portion of the base main body 54 far from the worm wheel 17 in the first direction projects toward a side farther from the worm wheel 17 than the flat plate portion 52 in the first direction.

In the present example, the two pad elastic pressing plates 50 configuring the pad 20 are connected to a part that protrudes toward one side in the second direction from between the two guide portions 43 in the base portion 51. Specifically, the two pad elastic pressing plates 50 are configured with the end portions of the flat plate portion 52 on both sides in the third direction.

In the present example, each of the two pad elastic pressing plates 50 has protrusions 58a and 58b extending in the first direction on the side surface on the other side in the second direction, as shown in FIGS. 12, 13, 15A to 15D, and 16. In the present example, each of the two pad elastic pressing plates 50 includes two protrusions 58a and 58b. The two protrusions 58a and 58b are disposed to be spaced apart from each other in the third direction. When implementing the present invention, the number of protrusions can also be one or three or more. In the present example, each of the two pad elastic pressing plates 50 has a slit 59 that penetrates in the second direction and extends in the first direction at the base end portion which is the end portion on the center side of the pad 20 in the third direction. In the present example, based on appropriate regulation of the width and length of the slit 59 and the plate thickness of the pad elastic pressing plate 50, the bending rigidity in the second direction of the base end portion of the pad elastic pressing plate 50 at the parts adjacent to each other on both sides in the length direction of the slit 59 is adjusted. However, when implementing the present invention, the slit can be omitted.

In the present example, the inner circumferential surface of the through-hole 53 has a fitting surface 60 configured as a cylindrical surface at an axially intermediate portion. The fitting surface 60 has an inner diameter slightly larger than the outer diameter of the small diameter cylindrical surface portion 31 at the tip end portion of the worm 18.

As shown in FIGS. 4, 6, 11, and 12, the pad 20 is assembled to the protrusion portion 39 of the holder 21 and is externally fitted to the tip end portion of the worm 18.

Specifically, while a part of the base portion 51 of the pad 20 on the side close to the worm wheel 17 in the first direction is disposed between the two guide portions 43 that configure the protrusion portion 39 of the holder 21, the two pad inclined surfaces 48 are in surface contact with the two holder inclined surfaces 45. The tip end portions of the protrusions 58a and 58b of the two pad elastic pressing plates 50 elastically press the two holder pressed surfaces 47 toward the other side in the second direction. Thereby, a preload is applied to the contact portion between the two holder inclined surfaces 45 and the two pad inclined surfaces 48.

The small diameter cylindrical surface portion 31 at the tip end portion of the worm 18 is internally fitted to the fitting surface 60 of the through-hole 53 of the pad 20 to be relatively rotatable without rattling in the radial direction.

Figure 6:
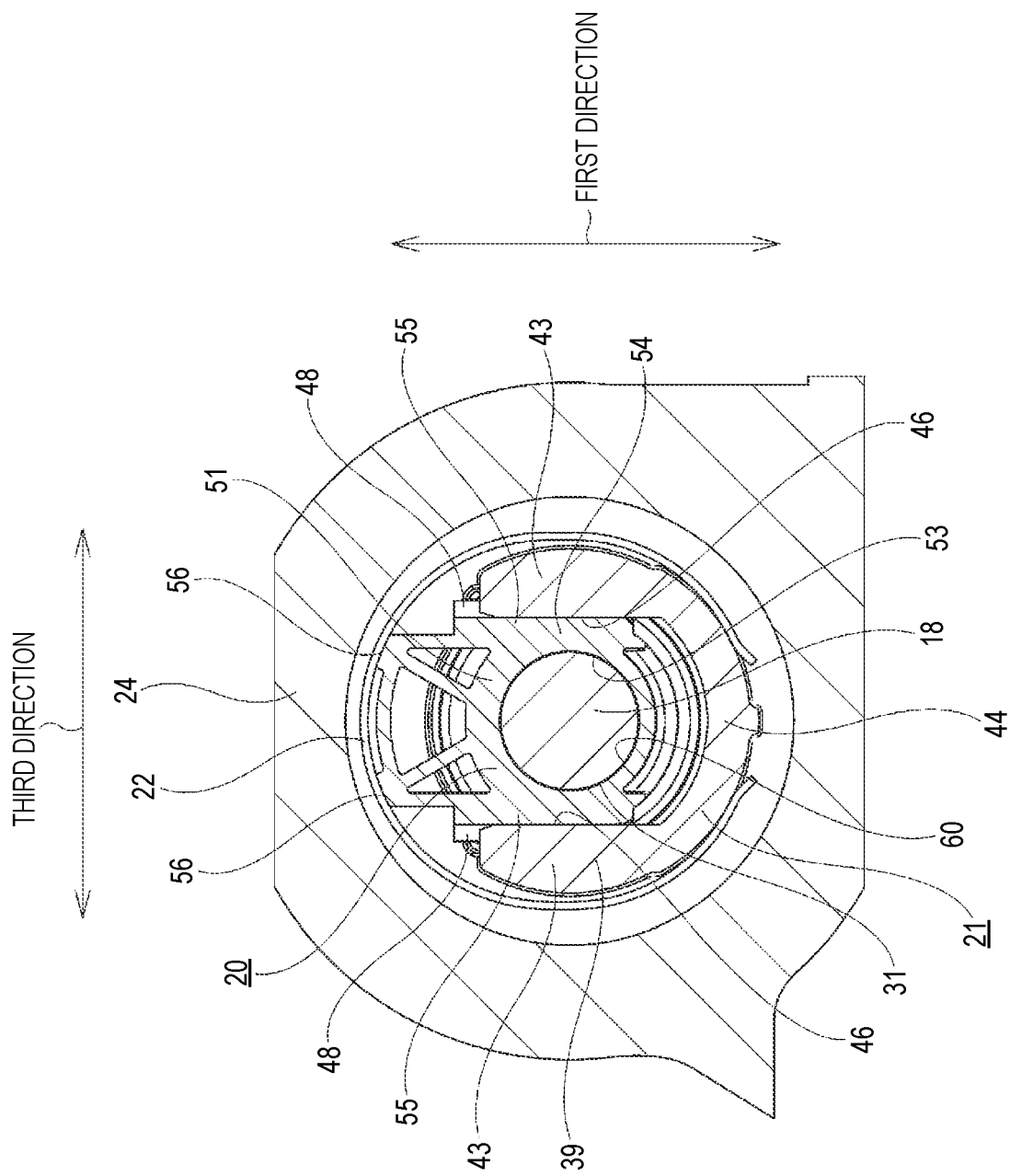
FIG. 6 is a sectional view taken along line C-C in FIG. 4.
Figure 7:
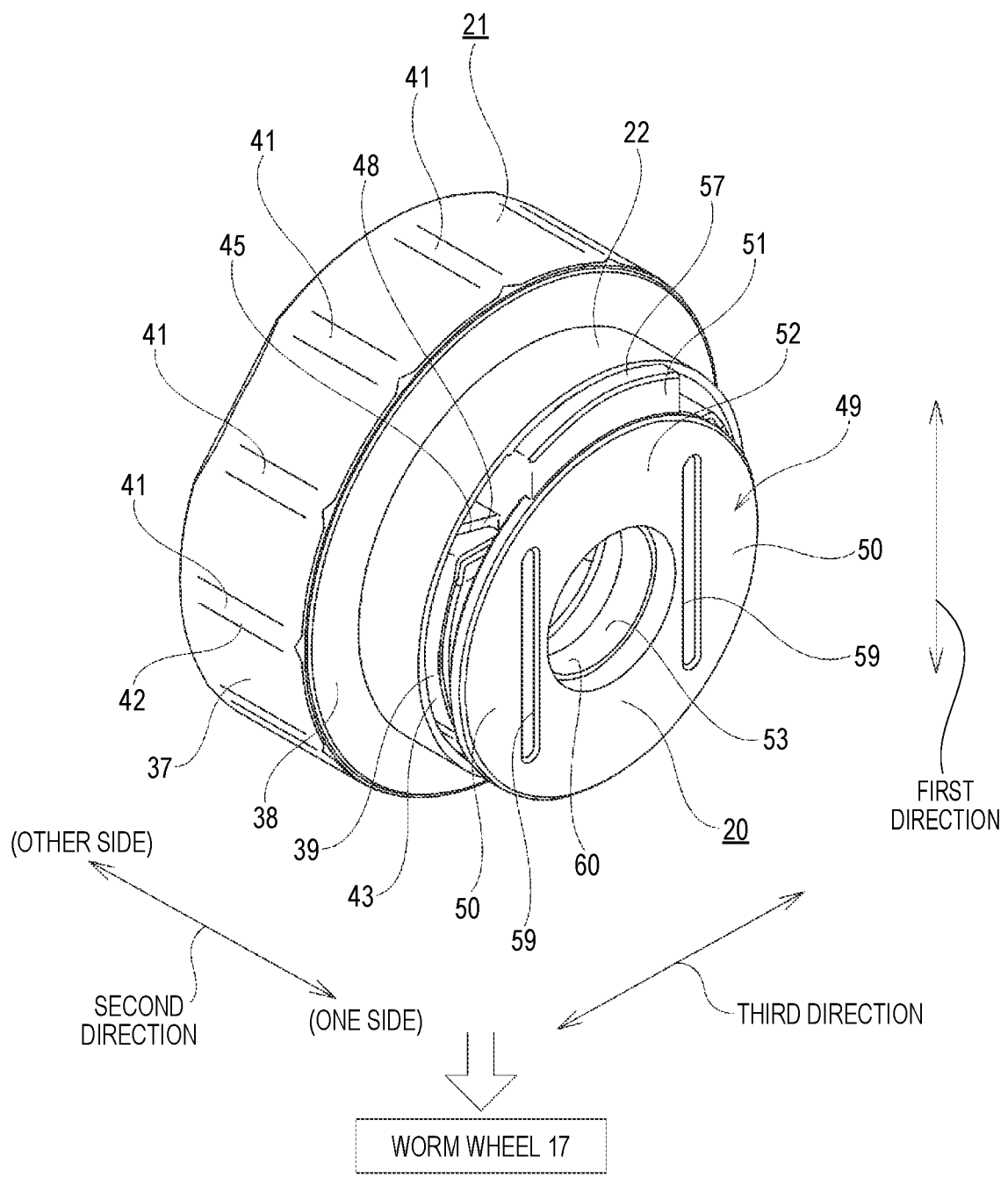
FIG. 7 is a perspective view of an urging mechanism (an assembly of a holder, a support bearing, a bush, a pad, and an elastic member) according to the first example.

Here, as shown in FIG. 6, a clearance in the first direction is present between the side surface of the base portion 51 of the pad 20 on the side close to the worm wheel 17 in the first direction, and the side surface of the connection portion 44 that configures the protrusion portion 39 of the holder 21 on the side far from the worm wheel 17 in the first direction. In the present example, the pad 20 can be displaced in the first direction with respect to the holder 21 based on the clearance in the first direction.

Figure 12:
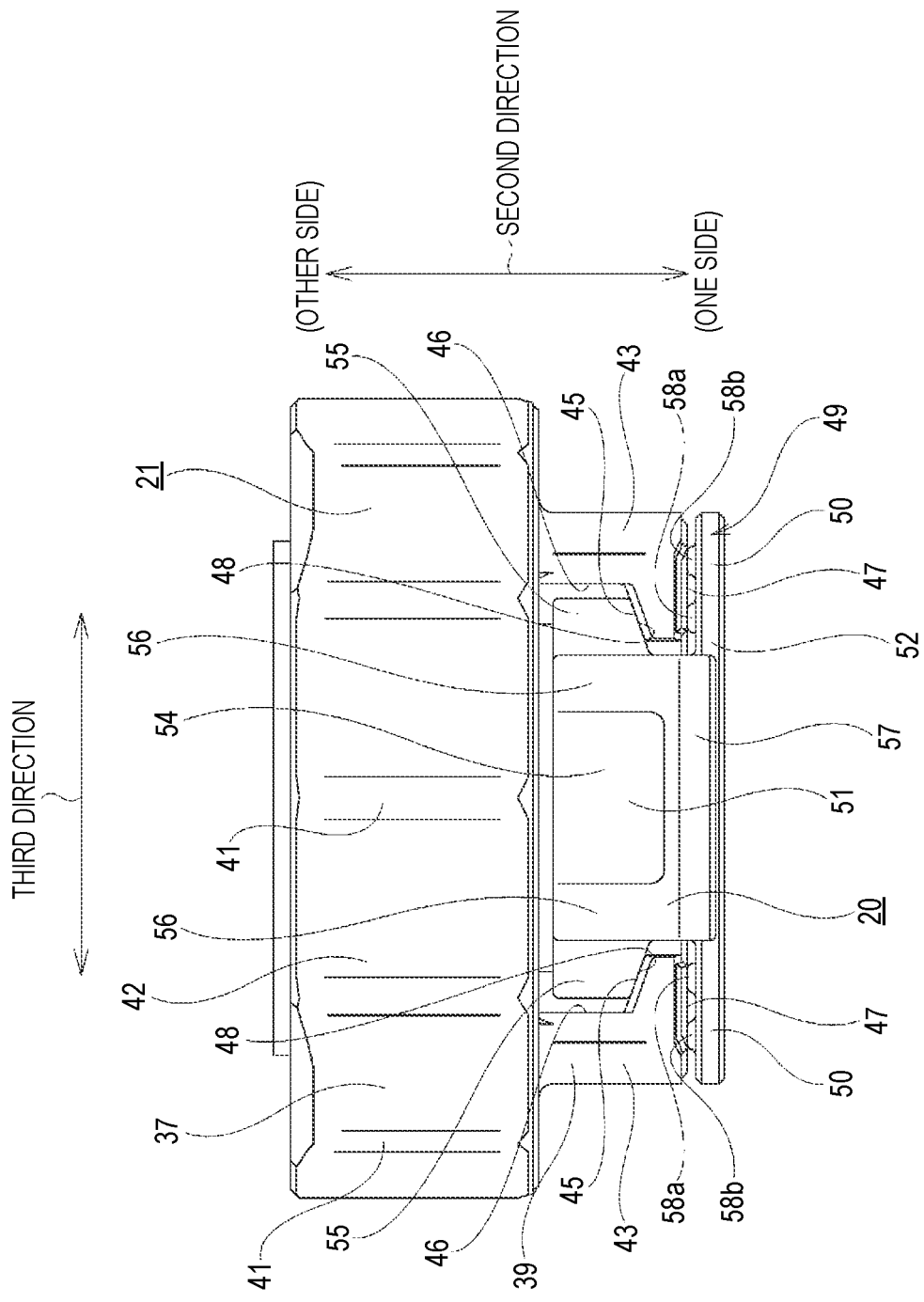
FIG. 12 is a diagram of the urging mechanism according to the first example viewed from above in FIG. 9 with the plate spring removed.
Figure 13:
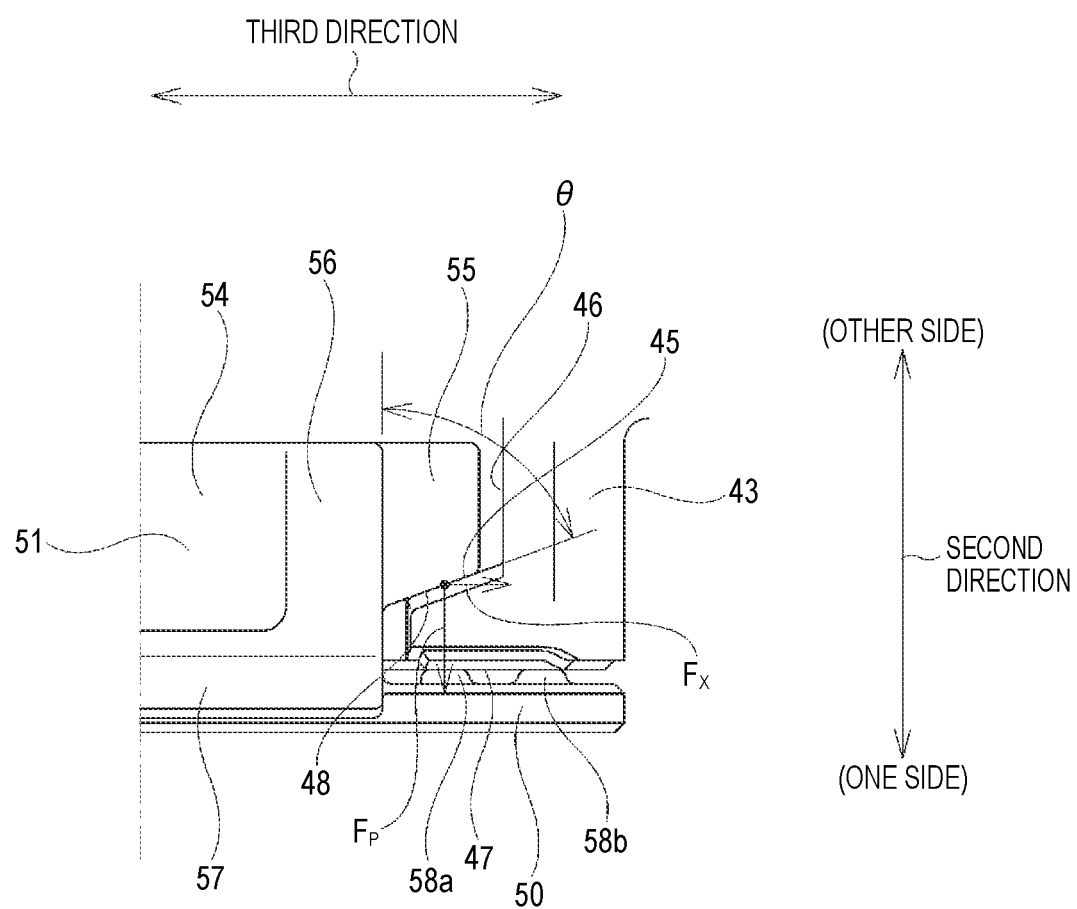
FIG. 13 is a partially enlarged view of FIG. 12.
Figure 16:
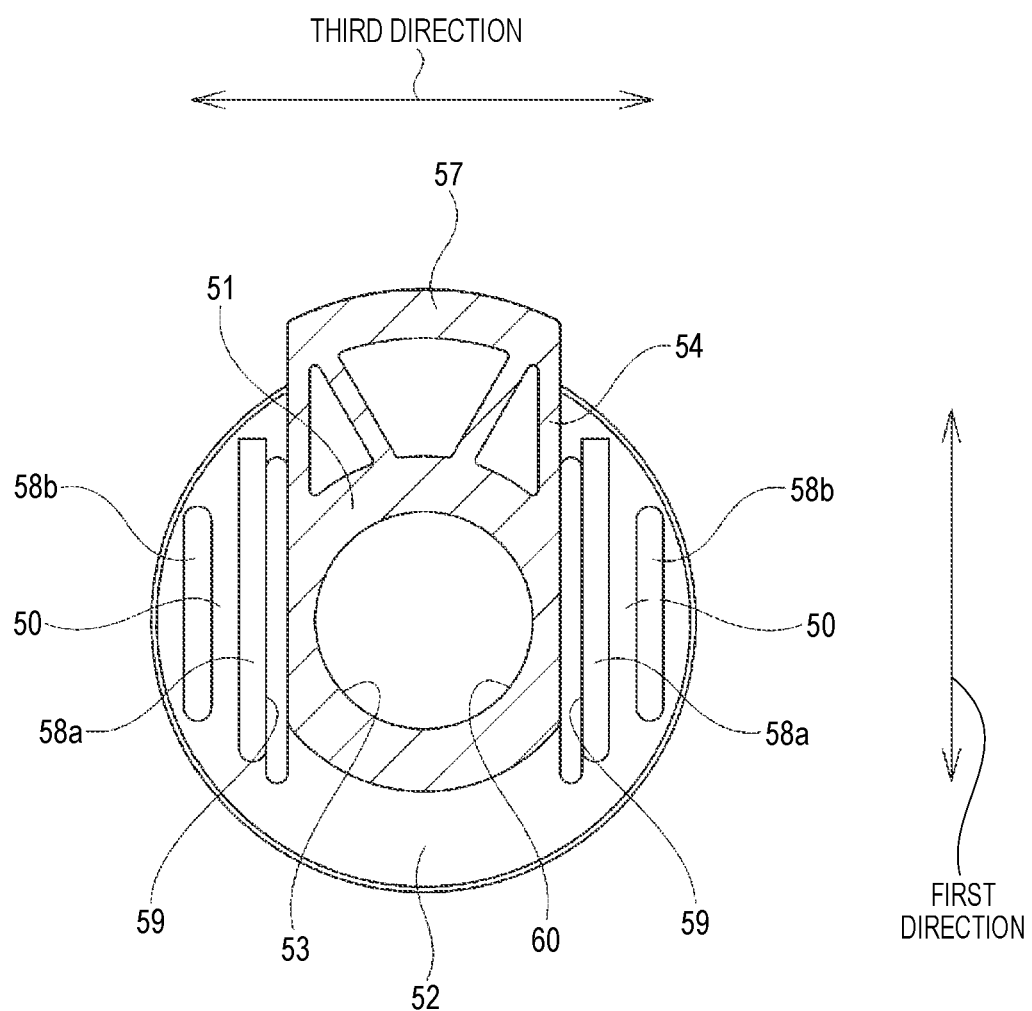
FIG. 16 is a sectional view taken along line D-D in FIG. 15B.
Figure 17:
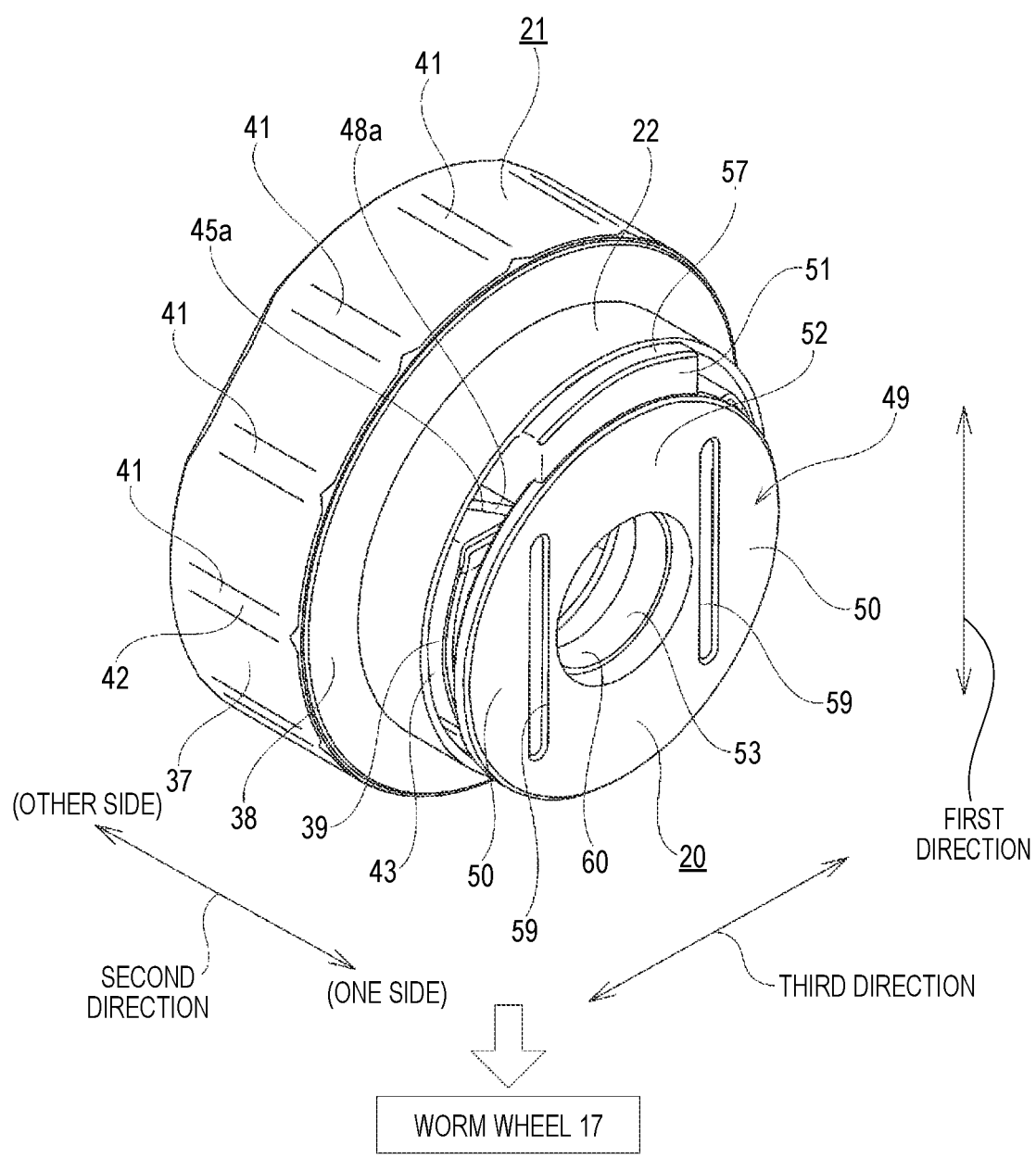
FIG. 17 is a perspective view of an urging mechanism according to a second example of the present invention.
Figure 18:
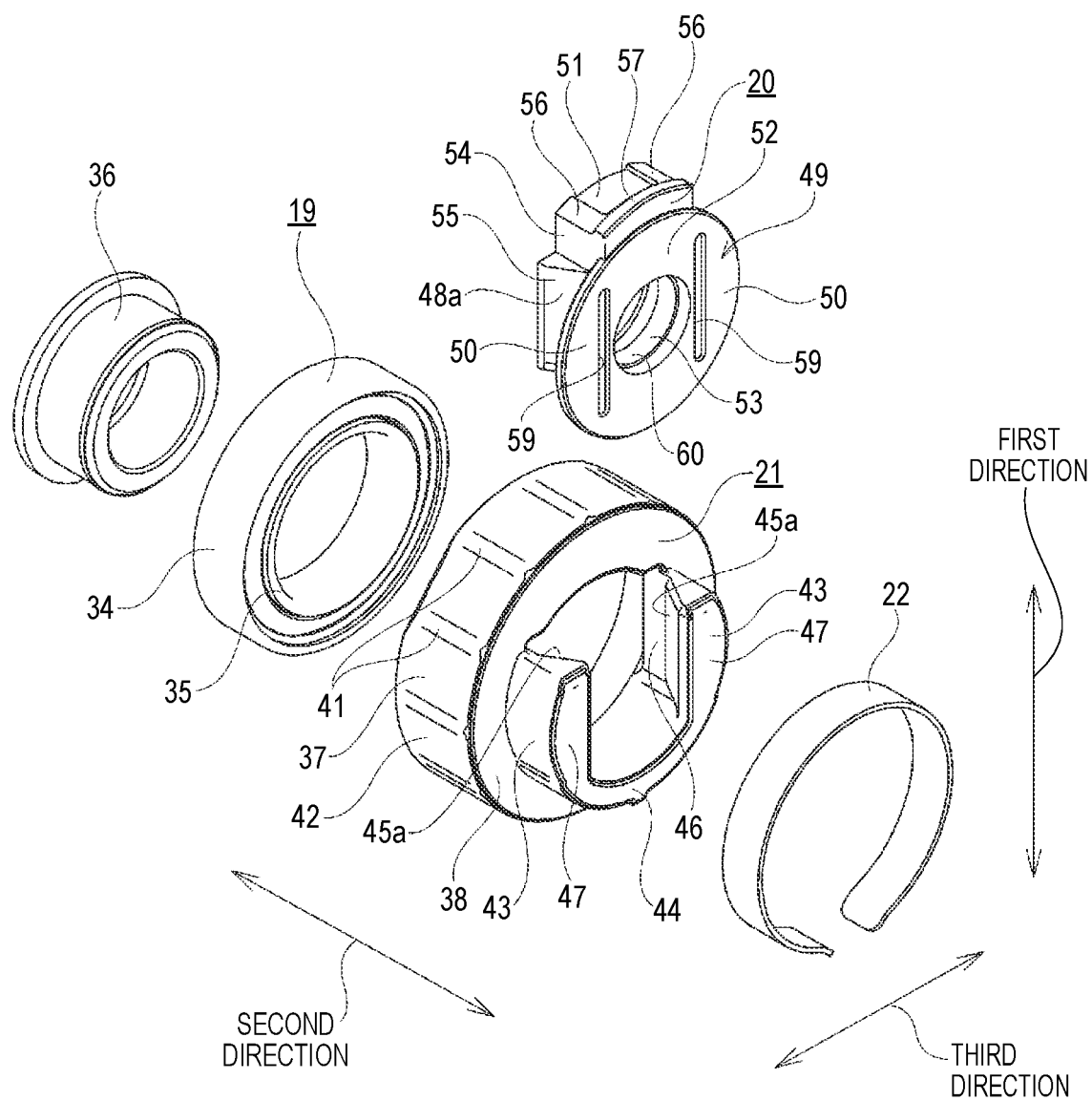
FIG. 18 is an exploded perspective view of the urging mechanism according to the second example.
Figure 19:
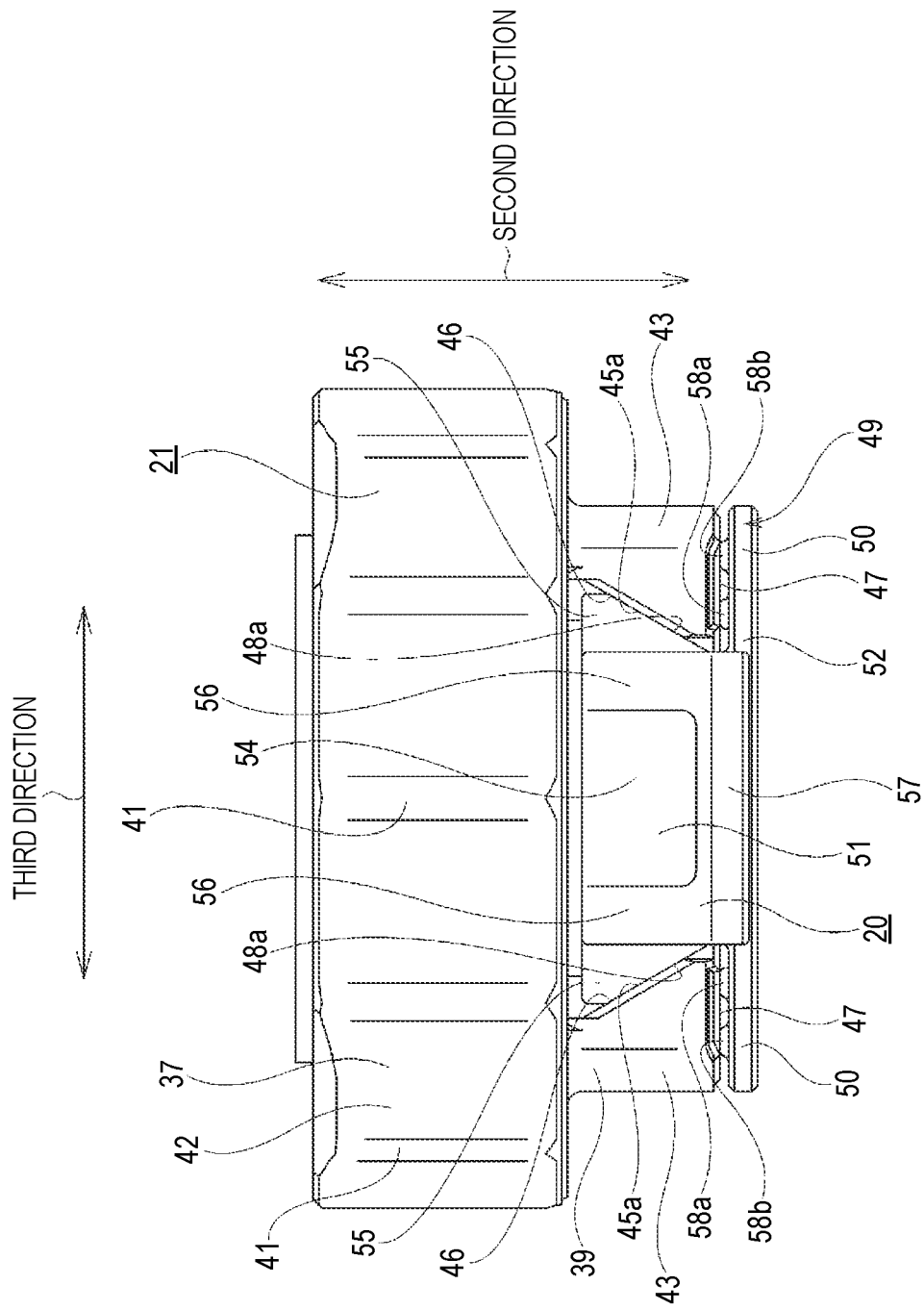
FIG. 19 is a diagram corresponding to FIG. 12 regarding the second example.
Figure 20:
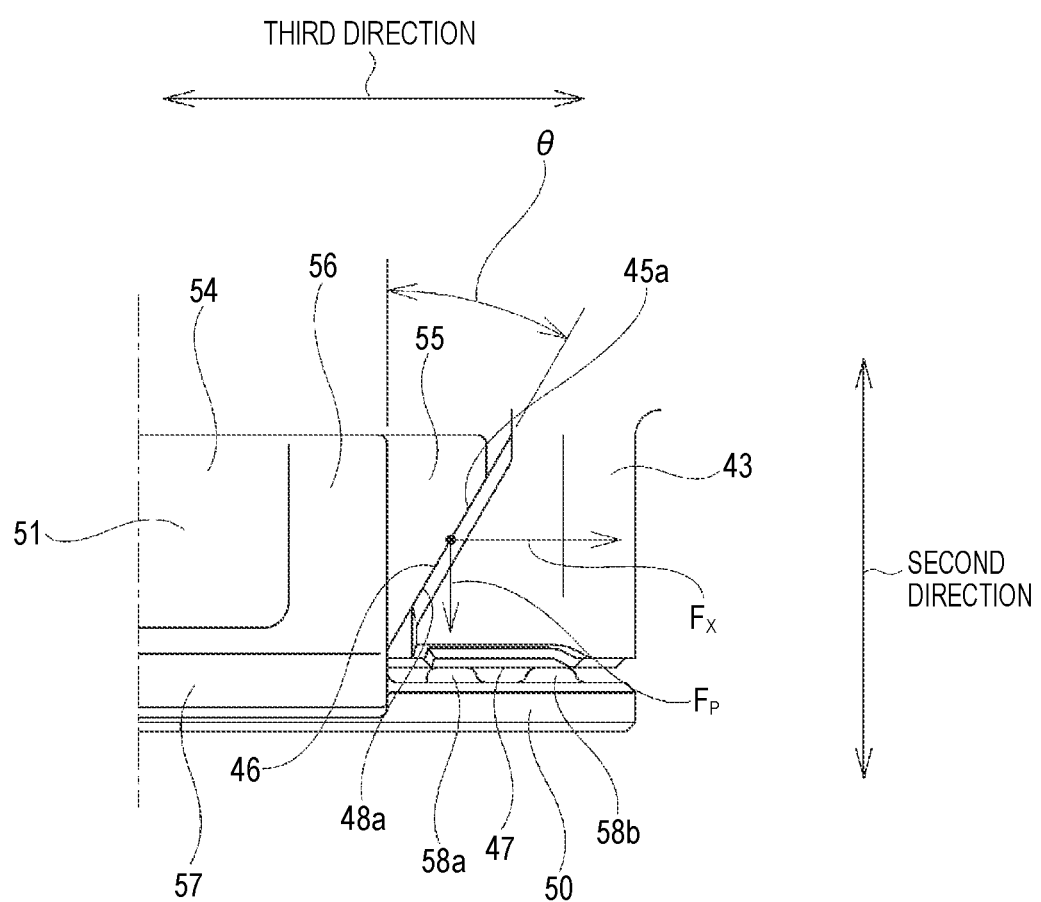
FIG. 20 is a partially enlarged view of FIG. 19.

Here, as shown in FIGS. 12 and 13, a clearance in the third direction is present between the base portion 51 of the pad 20 and each of the part positioned on one side of the two holder inclined surfaces 45 in the second direction and the part positioned on the other side of the two holder inclined surfaces 45 in the second direction on the inner surfaces 46 of the two guide portions 43. In the present example, the pad 20 can be displaced in the third direction with respect to the holder 21 based on the clearance in the third direction.

In the present example, the elastic member 22 is configured with a plate spring. More specifically, in the present example, the elastic member 22 is configured with a C-shaped cylindrical plate spring having a discontinuous portion at one location in the circumferential direction, as shown in FIGS. 6 and 8. However, when implementing the present invention, the shape of the plate spring configuring the elastic member 22 can also be made into a shape other than the C-shaped cylindrical shape. The elastic member can also be configured with a torsion coil spring.

The elastic member 22 is assembled to the holder 21 to be externally fitted to the base portion 51 of the pad 20 and the two guide portions 43. In the present example, while the base portion 51 of the pad 20 and the protrusion portion 39 of the holder 21 are inserted into the radially inner side of the elastic member 22, the inner circumferential surface of the circumferential center portion of the elastic member 22 is elastically pressed against the two pressed portions 56 of the pad 20, and the inner circumferential surface of both end portions of the elastic member 22 in the circumferential direction is elastically pressed against the side surface of the connection portion 44 configuring the protrusion portion 39 of the holder 21 on the side close to the worm wheel 17 in the first direction. Thereby, the tip end portion of the worm 18 is elastically urged via the pad 20 toward the worm wheel 17 side, that is, toward the side close to the worm wheel 17 in the first direction. Accordingly, the backlash at the meshing portion between the wheel teeth 25 and the worm teeth 26 is reduced.

According to the worm reducer 14 of the present example, the following effects can be achieved.

The two pad inclined surfaces 48 configuring the pad 20 are in surface contact with two holder inclined surfaces 45 configuring the holder 21. The tip end portions of the protrusions 58a and 58b of the two pad elastic pressing plates 50 configuring the pad 20 elastically press the two holder pressed surfaces 47 configuring the holder 21 toward the other side in the second direction. Thereby, a preload is applied to the contact portion between the two holder inclined surfaces 45 and the two pad inclined surfaces 48. Therefore, based on the contact between the two holder inclined surfaces 45 and the two pad inclined surfaces 48, displacement of the pad 20 in the third direction with respect to the holder 21 is regulated, and the pad 20 can prevent rattling without resistance in the third direction with respect to the holder 21.

Specifically, in the present example, as shown in FIGS. 12 and 13, based on the fact that the tip end portions of the protrusions 58a and 58b of the pad elastic pressing plate 50 elastically press the holder pressed surface 47 toward the other side in the second direction, an elastic force (preload force) Fp toward one side in the second direction acts from the pad inclined surface 48 to the holder inclined surface 45. Then, the elastic force Fp is converted into an elastic force (preload force) Fx acting from the pad inclined surface 48 to the holder inclined surface 45 and facing outward in the third direction. In the structure of the present example, based on the elastic force Fx, it is possible to prevent the pad 20 from rattling without resistance in the third direction with respect to the holder 21.

Therefore, even when the rotation direction of the worm 18 changes, and the direction of the component in the third direction of the reaction force applied from the wheel teeth 25 to the worm teeth 26 changes, the tip end portion of the worm 18 becomes difficult to displace in the third direction. As a result, it is possible to prevent abnormal noises such as rattling noise from occurring at the meshing portion between the wheel teeth 25 and the worm teeth 26, and abnormal noises such as collision noises from occurring between the pad 20 and the holder 21.

When implementing the present invention, based on the fact that the width and the length of the slit 59, the plate thickness of the pad elastic pressing plate 50, the height of the protrusions 58a and 58b in the second direction, and the like are changed, the bending rigidity in the second direction at a part of the base end portion of the pad elastic pressing plate 50 adjacent to both sides of the slit 59 in the length direction can be changed. Accordingly, the magnitude of the force with which the tip end portions of the protrusions 58a and 58b of the pad elastic pressing plate 50 elastically press the holder pressed surface 47 toward the other side in the second direction can be changed. Accordingly, the magnitude of the elastic force Fp can be changed freely.

The pad elastic pressing plate 50 locally presses the holder pressed surface 47 with the tip end portions of the protrusions 58a and 58b. Therefore, the pressing force can be stabilized compared to the case where the pad elastic pressing plate presses the holder pressed surface over a wide range.

The relational expression "Fx=Fp/tan θ" is established between the elastic force Fx and the elastic force Fp. In the present example, since the inclination angle θ=70°. Fx=Fp/tan 70°=0.4 Fp. That is, the elastic force Fx becomes smaller than the elastic force Fp. When implementing the present invention, the magnitude of the elastic force Fx can be changed freely by changing not only the magnitude of Fp but also the magnitude of the inclination angle θ. For example, when θ=45°, Fx=Fp can be satisfied, when 45°<θ<90°, Fx<Fp can be satisfied, and when 0°<θ<45°, Fx>Fp can be satisfied. The magnitude of the elastic force Fx can be adjusted by changing the inclination angle θ without changing the material of the pad 20 (the elastic force based on the material). Therefore, the magnitude of the elastic force Fx can be easily adjusted at the design stage.

Note that, when implementing the present invention, the inclination angle of the holder inclined surface 45 in the second direction and the inclination angle of the pad inclined surface 48 in the second direction do not need to be strictly the same, and may be changed within the manufacturing error range. The inclination angle of the holder inclined surface 45 in the second direction can also be made smaller than the inclination angle of the pad inclined surface 48 in the second direction. For example, the inclination angle of the holder inclined surface 45 in the second direction can be made smaller than the inclination angle of the pad inclined surface 48 in the second direction by approximately 0.5°. Accordingly, at the contact portion between the holder inclined surface 45 and the pad inclined surface 48, the tip end portion of the pad inclined surface 48 (the right end portion in the third direction in FIG. 13, the other end portion in the second direction in FIG. 13) comes into particularly strong surface contact with the holder inclined surface 45. As a result, the posture of the pad 20 with respect to the holder 21 becomes stable.

Note that, when viewed in the first direction, as shown in FIGS. 12 and 13, the case is considered in which the pad 20 is displaced on either side of the holder 21 in the third direction, for example, on the right side in FIGS. 12 and 13, from the neutral state where the central axis of the holder 21 and the central axis of the pad 20 are aligned with each other. Here, along with the sliding displacement of the right pad inclined surface 48 along the right holder inclined surface 45, the base portion 51 of the pad 20 is displaced toward the other side in the second direction, and at the same time, the right pad elastic pressing plate 50 is elastically deformed to fall to one side in the second direction. Then, as the elastic pressing force acting from the right pad elastic pressing plate 50 to the right holder pressed surface 47 increases according to the amount of the elastic deformation, the elastic forces Fp and Fx increase. As a result, the pad 20 becomes more difficult to displace toward the right side. The same applies to the case where the pad 20 is displaced from the neutral state to the left side in FIGS. 12 and 13 with respect to the holder 21.

The inner circumferential surface of the circumferentially center portion of the elastic member 22 is elastically pressed against the two pressed portions 56 provided at both end portions of the base main body 54 configuring the pad 20 in the third direction. Therefore, force having not only a component in a direction approaching the worm wheel 17 in the first direction but also a component in opposite directions in the third direction is applied to the two pressed portions 56. From such point of view, when the rotation direction of the worm 18 changes, the tip end portion of the worm 18 becomes difficult to displace in the third direction.

Second Example of Embodiment

A second example of the embodiment of the present invention will be described using FIGS. 17 to 20.

In the structure of the present example, the inclination angle θ of the holder inclined surface 45*a* and the pad inclined surface 48*a* with respect to the second direction is 30°. Therefore, the elastic force Fx acting from the pad inclined surface 48*a* to the holder inclined surface 45*a* and facing outward in the third direction is Fx=Fp/tan 30°=1.7 Fp. In other words, the elastic force Fx is larger than the elastic force Fp acting from the pad inclined surface 48*a* to the holder inclined surface 45*a* and facing one side in the second direction. Therefore, when the rotation direction of the worm 18 (refer to FIGS. 3 and 4) changes, the tip end portion of the worm 18 can be made more difficult to displace in the third direction.

Other configurations and effects are the same as in the first example of the embodiment.

Third Example of Embodiment

A third example of the embodiment of the present invention will be described using FIGS. 21A to 22C. In the present embodiment, the configuration of the elastic member 22 is different from each of the above-described embodiments. The other configurations and effects are the same as those of the first and second examples of the embodiment, and thus the description thereof will be omitted.

Figure 22A:
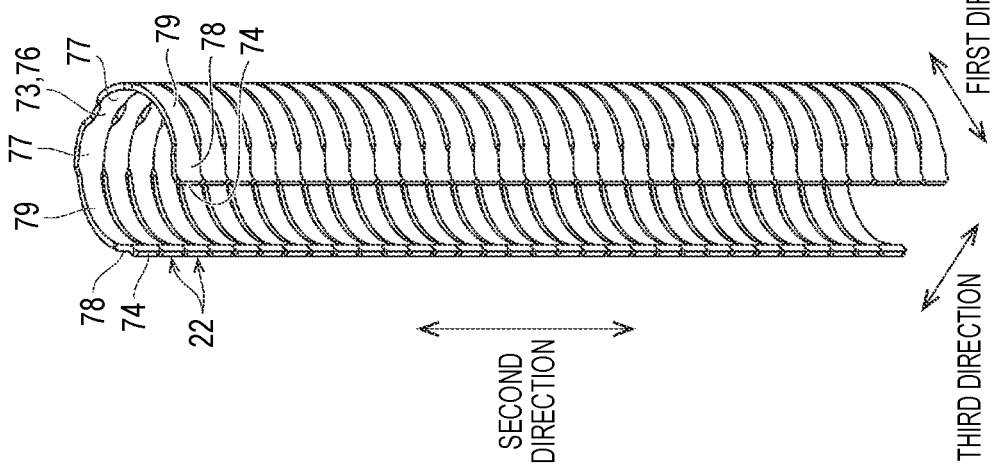
FIGS. 22A to 22C are diagrams showing a stacked state of the elastic members, with FIG. 22A showing a perspective view, FIG. 22B showing a view in the first direction, and FIG. 22C showing a view from one side in the third direction.
Figure 22B:
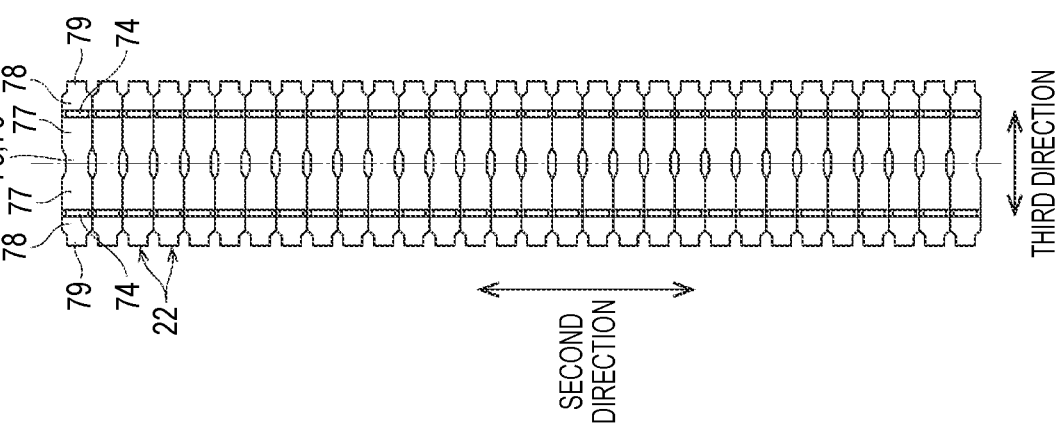
Figure 22C:
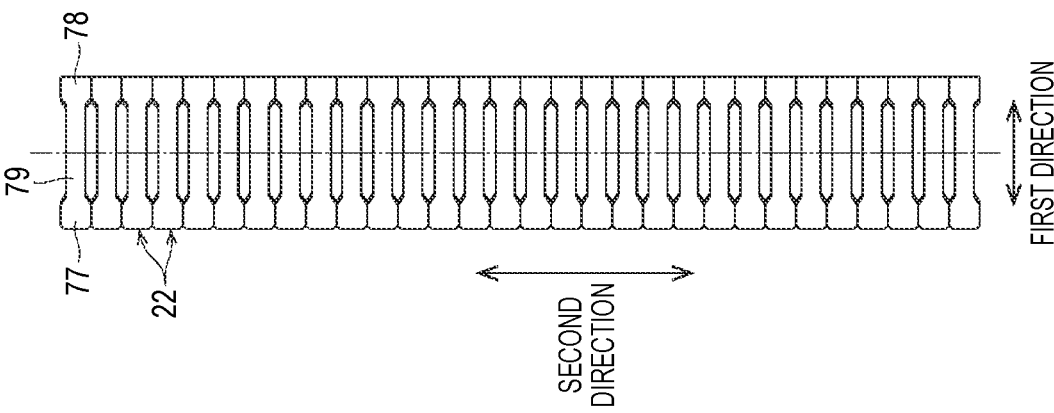

FIGS. 21A to 21D are diagrams showing the elastic member according to the present embodiment, with FIG. 21A showing a view from one side in the third direction, FIG. 21B showing a view in the second direction, FIG. 21C showing a view from the other side in the third direction, and FIG. 21D showing a view in the first direction. FIGS. 22A to 22C are diagrams showing a stacked state of the elastic members, with FIG. 22A showing a perspective view, FIG. 22B showing a view in the first direction, and FIG. 22C showing a view from one side in the third direction.

As described above, the elastic member 22 is assembled to the holder 21 and elastically urges the tip end portion of the worm 18 toward the worm wheel 17 (the lower side in FIGS. 3 and 4) via the pad 20. As shown in FIGS. 21A to 21D, the elastic member 22 is configured with an approximately C-shaped cylindrical plate spring having a discontinuous portion 71 at one location in the circumferential direction, and by increasing the set load of the plate spring, it is possible to prevent the occurrence of backlash at the meshing portion between the wheel teeth 25 and the worm teeth 26, and to prevent the occurrence of abnormal noise. However, when the set load is increased, a trade-off arises in that the friction at the meshing portion between the wheel teeth 25 and the worm teeth 26 increases.

Therefore, the set load by the elastic member 22 needs to be moderate in friction while preventing the occurrence of abnormal noise at the meshing portion between the wheel teeth 25 and the worm teeth 26, and thus a plurality of elastic members 22 with different set loads are required.

Here, as a method of changing the set load of the elastic member 22, there are three methods such as a method of changing the dimension of the discontinuous portion 71 at one location in the circumferential direction of the elastic member 22, a method of changing the plate thickness (radial thickness) of the elastic member 22, and a method of changing the plate width (width in the second direction) of the elastic member 22.

As shown in FIG. 21B, the elastic member 22 has the discontinuous portion 71 having a substantially C-shaped shape when viewed in the second direction, and thus, when paying no attention to the packing form, the plurality of elastic members 22 may become entangled with each other, causing problems in workability. Therefore, it is preferable to perform stack packing in which the plurality of elastic members 22 are stacked and packed.

The present inventors have invented a new shape that enables stack packing in which the elastic members 22 do not become entangled with each other when selecting the method of changing the plate width (the width in the second direction) of the elastic members 22 among the above three methods of changing the set load. The specific configuration of the elastic member 22 will be described below.

As shown in FIGS. 21A to 21D, the elastic member 22 has a base portion 73 extending toward both sides in the third direction on one side in the first direction (the upper side in FIG. 21B), a pair of arm portions 75A and 75B extending in a substantially semi-cylindrical shape from both end portions of the base portion 73 in the third direction toward the other side in the first direction (the lower side in FIG. 21B), and projection portions 74 and 74 that are bent from the tip end portions of the pair of the pair of arm portions 75A and 75B and protrude toward the other side in the first direction (the lower side in FIG. 21B). As shown in FIG. 21B, the plate thickness (radial thickness) of the elastic member 22 is constant throughout the base portion 73, the pair of arm portions 75A and 75B, and the projection portions 74 and 74.

As shown in FIG. 21B, the base portion 73 has a planar radially outer surface 73*a* and a radially inner surface 73*b* extending in the third direction. Therefore, the base portion 73 has a substantially flat plate shape extending in the third direction. The elastic member 22 is assembled to the holder 21 to be externally fitted to the base portion 51 of the pad 20 and the two guide portions 43 (refer to FIG. 11 and the like), but since the base portion 73 is flat, it is possible to easily determine the phase with respect to the holder 21 using the base portion 73 as a reference.

As shown in FIG. 21D, the base portion 73 has a constricted portion 76 of which the plate width in the second direction is L1. The plate width L1 of the constricted portion 76 of the base portion 73 is smaller than plate widths L2 and L3 of a base portion side wide portion 77 and a tip end portion side wide portion 78 of the arm portions 75A and 75B (L1<L2=L3), which will be described later. As described above, since the base portion 73 has the constricted portion 76 and has a partially constricted shape, when the elastic member 22 is assembled to the holder 21, the phase can be easily determined with respect to the holder 21 using the constricted portion 76 as a reference. Note that the constricted portion 76 of the base portion 73 does not contribute to adjusting the set load of the elastic member 22, unlike narrow portions 79 and 79 of the pair of arm portions 75A and 75B, which will be described later.

Note that the method for determining the phase between the elastic member 22 and the holder 21 is not limited to the above-described method using the flat shape of the base portion 73 as a reference or the method using the constricted portion 76 as a reference, but any method such as imprinting a mark may be used. Therefore, as long as the phase can be determined, the base portion 73 does not necessarily have to have a substantially flat plate shape extending in the third direction, and may have a curved shape. When the phase can be determined, the base portion 73 does not necessarily have to include the constricted portion 76 having the plate width L1, and may have the same plate width as the plate widths L2 and L3 of the base portion side wide portion 77 and the tip end portion side wide portion 78 of the arm portions 75A and 75B, which will be described later.

The pair of arm portions 75A and 75B include a radially outer surface 75*c* and a radially inner surface 75*d* that are connected to the radially outer surface 73a and the radially inner surface 73b of the base portion 73, respectively. The radially outer surface 75c and the radially inner surface 75d are each formed of a single curved surface having the same radius of curvature.

The pair of arm portions 75A and 75B include the base portion side wide portion 77 connected to the base portion 73 and having a plate width of L2 in the second direction, a narrow portion 79 connected to the base portion side wide portion 77 and having a plate width of L4 in the second direction, and the tip end portion side wide portion 78 connected to the narrow portion 79 and having a plate width of L3 in the second direction. Note that the base portion side wide portion 77 is disposed on one side in the first direction (the upper side in FIG. 21B) from the center O of the elastic member 22, the narrow portion 79 is disposed to overlap the center O of the elastic member in the first direction, and the tip end portion side wide portion 78 is disposed on the other side in the first direction (the lower side in FIG. 21B) from the center O of the elastic member 22. Here, the plate width L2 of the base portion side wide portion 77 and the plate width L3 of the tip end portion side wide portion 78 are the same (L2=L3). The plate width L4 of the narrow portion 79 is smaller than the plate widths L2 and L3 of the base portion side wide portion 77 and the tip end portion side wide portion 78 (L4<L2=L3).

The plate width in the second direction of the projection portion 74 that is continuous with the tip end portion side wide portion 78 is equal to the plate width L3 of the tip end portion side wide portion 78. Note that the projection portion 74 does not necessarily have to be provided.

As such, in the elastic member 22 of the present embodiment, the narrow portion 79, having the plate width L4 smaller than those of the base portion side wide portion 77 and the tip end portion side wide portion 78 on both sides in the circumferential direction, is provided at the circumferentially intermediate portion of the pair of arm portions 75A and 75B, and the set load of the elastic member 22 is appropriately set by the narrow portion 79. That is, by providing the narrow portion 79, the set load of the elastic member 22 is reduced, and the friction at the meshing portion between the wheel teeth 25 and the worm teeth 26 is reduced.

The base portion side wide portion 77 and the tip end portion side wide portion 78 having the plate widths L2 and L3 equal to each other are provided on both side portions of the pair of arm portions 75A and 75B in the circumferential direction. Therefore, as shown in FIGS. 22A to 22C, when performing stack packing in which the plurality of elastic members 22 are stacked in the second direction, by causing the entire circumferential areas of the base portion side wide portion 77 and the tip end portion side wide portion 78 of the upper and lower elastic members 22 to abut against each other, the postures of the plurality of elastic members 22 can be maintained appropriately without being tilted with respect to the direction of gravity. Note that the projection portion 74 provided integrally with the tip end portion side wide portion 78 and having the plate width L3 also abuts against the projection portion 74 of the upper and lower elastic members 22.

In the present embodiment, to stack and pack the plurality of elastic members 22, the plate widths L2 and L3 are set to be the same at four locations including the tip end portion side wide portions 78 and 78 (and the projection portions 74 and 74 provided integrally with the tip end portion side wide portions 78 and 78) provided on the tip end portion sides of the pair of arm portions 75A and 75B, respectively, and the base portion side wide portions 77 and 77 provided on the base portion sides of the pair of arm portions 75A and 75B, respectively, and the elastic members 22 are supported at the four locations.

However, the present invention is not limited thereto, and to stack and pack the plurality of elastic members 22, the plate widths of at least three locations needs to be the same. For example, by not providing the constricted portion 76 in the base portion 73 and making the plate width of the base portion 73 the same as the plate width L2 of the base portion side wide portions 77 and 77, the base portion side wide portions 77 and 77 of the pair of arm portions 75A and 75B and the base portion 73 may be integrally formed with the plate width of L2. Here, the plate widths L2 and L3 are set to be the same at the three locations including the two locations of the tip end portion side wide portions 78 and 78 of the pair of arm portions 75A and 75B, and one location of the base portion side wide portions 77 and 77 and the base portion 73 of the pair of integrally formed arm portions 75A and 75B, and the elastic members 22 stacked at the three locations are appropriately supported without tilting each other.

Comparative Example

Figure 24A:
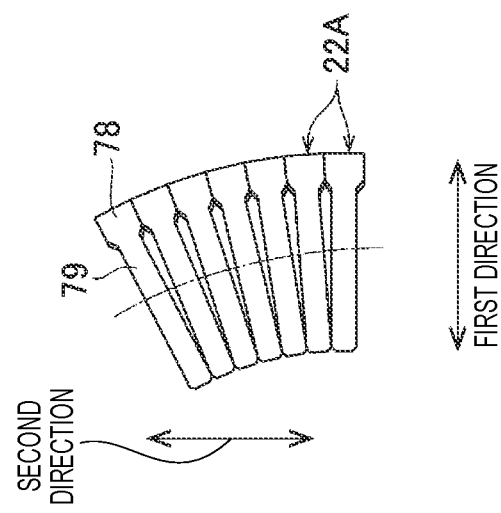
FIGS. 24A to 24C are diagrams showing a stacked state of the elastic members according to the comparative example, with FIG. 24A showing a perspective view.
Figure 24B:
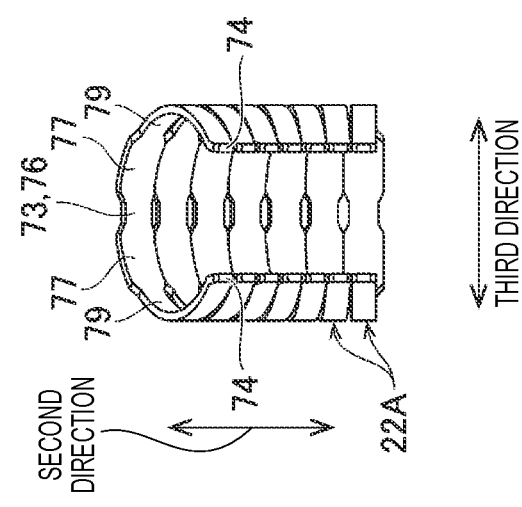
Figure 24C:
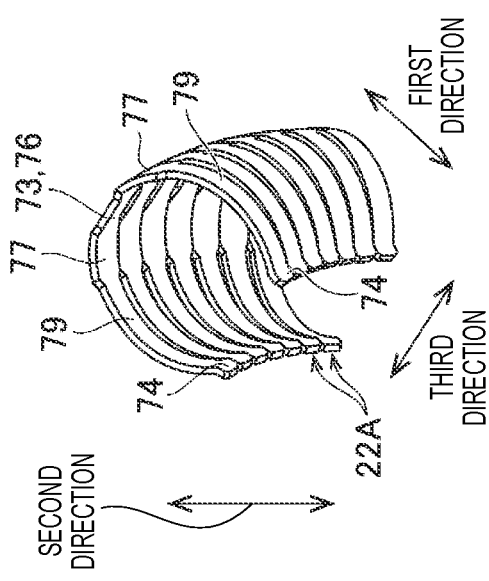
Figure 25:
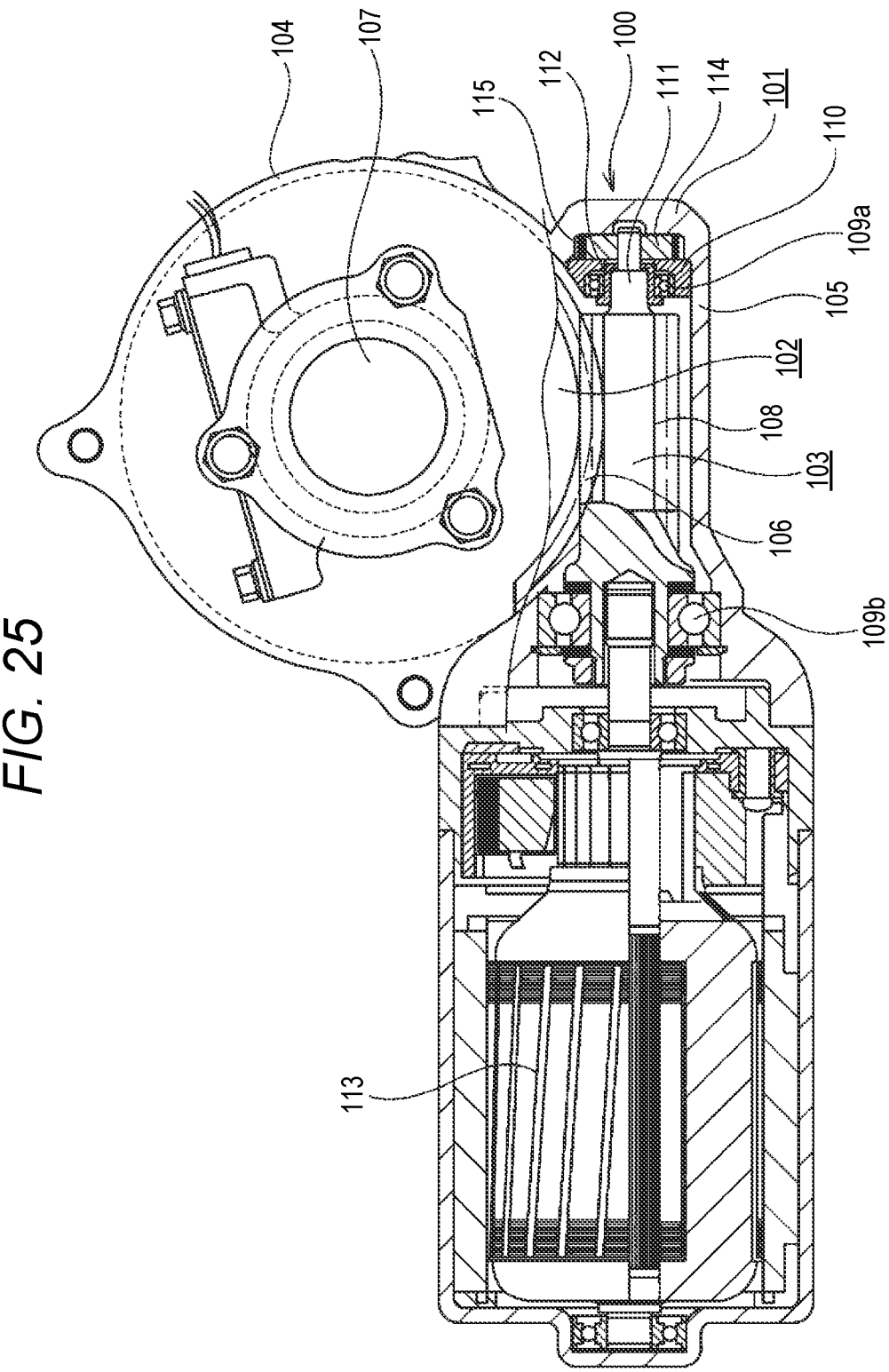
FIG. 25 is a sectional view showing an example of a related-art structure of the worm reducer.

FIGS. 23A to 23D are diagrams showing the elastic member according to a comparative example, with FIG. 23A showing a view from one side in the third direction, FIG. 23B showing a view in the second direction, FIG. 23C showing a view from the other side in the third direction, and FIG. 23D showing a view in the first direction. FIGS. 24A to 24C are diagrams showing a stacked state of the elastic members according to the comparative example, with FIG. 24A showing a perspective view, FIG. 24B showing a view in the first direction, and FIG. 24C showing a view in the third direction.

In the elastic member 22A according to the comparative example, the pair of arm portions 75A and 75B has the base portion side wide portion 77 connected to the base portion 73 and having a plate width of L2 in the second direction, and the narrow portion 79 connected to the base portion side wide portion 77 and having a plate width of L4 in the second direction. That is, the pair of arm portions 75A and 75B is not provided with the tip end portion side wide portion 78 connected to the narrow portion 79 and having a plate width of L3 in the second direction, as in the third embodiment described above. Here, the projection portion 74 is continuous with the narrow portion 79, and the plate width of the projection portion 74 in the second direction is equal to the plate width L4 of the narrow portion 79.

In the elastic member 22A of the comparative example, the narrow portion 79 having the plate width L4 smaller than the plate width L2 of the base portion side wide portion 77 is provided at a part other than the base portion side wide portion 77, and a set load of the elastic member 22 is set by the narrow portion 79. That is, by providing the narrow portion 79, the set load of the elastic member 22 is reduced, and the friction at the meshing portion between the wheel teeth 25 and the worm teeth 26 is reduced.

As described above, the elastic member 22A of the comparative example is excellent in that the set load can be adjusted, but has a problem in that the elastic member 22A cannot be stacked and packed. As shown in FIGS. 24A to 24C, when stack packing is performed by stacking the plurality of elastic members 22A in the second direction, the base portion side wide portions 77 and 77 of the upper and lower elastic members 22 come into contact with each other, and at the same time, the tip end portions (the projection portions 74 and 74) of the narrow portions 79 and 79 come into contact with each other. Here, since the plate width L4 of the narrow portions 79 and 79 (projection portions 74 and 74) is smaller than the plate width L2 of the base portion side wide portions 77 and 77, as the elastic members 22A are stacked, the elastic members 22A are tilted toward the narrow portions 79 and 79 (the projection portions 74 and 74). Therefore, the elastic member 22A of the comparative example is not suitable for stack packing.

In each of the embodiments described above, the holder has two holder inclined surfaces (holder engagement portions) at positions sandwiching the pad from both sides in the third direction, the pad has two pad engagement portions (pad inclined surfaces) that come into contact with the two holder engagement portions on both side portions in the third direction, and the displacement of the pad in the third direction with respect to the holder is regulated based on the contact between the two holder engagement portions and the two pad engagement portions. However, at least one holder inclined surface (holder engagement portion) and one pad engagement portion (pad inclined surface) needs to be provided. That is, a structure may be adopted in which the holder may have a holder engagement portion in at least one of the positions sandwiching the pad from both sides in the third direction orthogonal to both the first direction that is an urging direction of the elastic member and the second direction that is the axial direction of the worm accommodation portion, the pad may have a pad engagement portion that comes into contact with the holder engagement portion in at least a part of both side portions in the third direction, and displacement of the pad in the third direction with respect to the holder is regulated based on the contact between the holder engagement portion and the pad engagement portion.

In each of the embodiments described above, a structure is adopted in which the two holder engagement portions are configured by two holder inclined surfaces, and the two pad engagement portions are configured by two pad inclined surfaces that are in surface contact with the two holder inclined surfaces. However, when implementing the present invention, when it is possible to regulate (reduce or prevent) displacement of the pad in the third direction with respect to the holder based on the contact between the two holder engagement portions and the two pad engagement portions, the holder engagement portion and the pad engagement portion are not limited to the holder inclined surface and the pad inclined surface, and may have any shape. When adopting a holder inclined surface and a pad inclined surface, the inclined surfaces are not limited to an inclined flat surface, but an inclined curved surface can also be adopted.

Although various embodiments were described with reference to the drawings, it is needless to say that the present invention is not limited to such examples. It is obvious that those skilled in the art can come up with various examples of changes or modifications within the scope of the claims, which are also naturally understood that the examples of changes or modifications belong to the technical scope of the present invention. Each configuration element in the above-described embodiment may be combined in any manner within the range that does not depart from the gist of the invention.

REFERENCE SIGNS LIST

1 Electric power steering device
2 Steering wheel
3 Steering shaft
4 Steering column
5a, 5b Universal joint
6 Intermediate shaft
7 Steering gear unit
8 Electric assist device
9 Pinion shaft
10 Rack shaft
11 Housing
12 Rack accommodation portion
13 Pinion accommodation portion
14 Worm reducer
15 Electric motor
16 Housing
17 Worm wheel
18 Worm
19 Support bearing
20 Pad
21 Holder
22 Elastic member
23 Wheel accommodation portion
24 Worm accommodation portion
25 Wheel teeth
26 Worm teeth
27 Female spline portion
28 Output shaft
29 Male spline portion
30 Ball bearing
31 Small diameter cylindrical surface portion
32 Large diameter cylindrical surface portion
33 Inner ring
34 Outer ring
35 Ball
36 Bush
37 Tubular portion
38 Side plate portion
39 Protrusion portion
40 Bearing holding surface
41 Protrusion
42 Fitting surface
43 Guide portion
44 Connection portion
45, 45a Holder inclined surface (holder engagement portion)
46 Inner surface
47 Holder pressed surface
48, 48a Pad inclined surface (pad engagement portion)
49 Pad elastic pressing portion
50 Pad elastic pressing plate
51 Base portion
52 Flat plate portion
53 Through-hole
54 Base main body
55 Base projection portion
56 Pressed portion
57 Flange portion
58a. 58b Protrusion
59 Slit
60 Fitting surface
61 Inner circumferential surface
62 Recess portion
71 Discontinuous portion
73 Base portion
73a Radially outer surface
73b Radially inner surface
74 Projection portion
75A, 75B Arm portion 75c Radially outer surface
75d Radially inner surface
76 Constricted portion
77 Base portion side wide portion
78 Tip end portion side wide portion
79 Narrow portion
100 Worm reducer
101 Housing
102 Worm wheel
103 Worm
104 Wheel accommodation portion
105 Worm accommodation portion
106 Wheel teeth
107 Rotary shaft
108 Worm teeth
109a, 109b Ball bearing
110 Holder
111 Large diameter portion
112 Bush
113 Electric motor
114 Pad
115 Torsion coil spring

The invention claimed is:

1. A worm reducer comprising:
a housing having a wheel accommodation portion, and a worm accommodation portion disposed in a twisted position with respect to the wheel accommodation portion and having an axially intermediate portion open to the wheel accommodation portion;
a worm wheel having wheel teeth on an outer circumferential surface thereof and rotatably supported inside the wheel accommodation portion;
a worm having worm teeth that mesh with the wheel teeth on an outer circumferential surface thereof, and rotatably supported inside the worm accommodation portion;
a holder configured in an annular shape, through which a tip end portion of the worm is inserted radially inward, and which is internally fitted and fixed to the worm accommodation portion;
a support bearing which is a rolling bearing having an inner ring and an outer ring, and which is disposed between an outer circumferential surface of the tip end portion of the worm and an inner circumferential surface of the holder while a clearance in a radial direction is interposed between an inner circumferential surface of the inner ring and the outer circumferential surface of the tip end portion of the worm, or between an outer circumferential surface of the outer ring and the inner circumferential surface of the holder;
a pad disposed around the tip end portion of the worm at a location adjacent to the support bearing in the axial direction, and used to press the tip end portion of the worm in a direction toward the worm wheel; and
an elastic member assembled to the holder and elastically urging the tip end portion of the worm toward the worm wheel via the pad, wherein:
the holder has a holder engagement portion in at least one of the positions sandwiching the pad from both sides in a third direction orthogonal to both a first direction that is an urging direction of the elastic member and a second direction that is the axial direction of the worm accommodation portion;
the pad has a pad engagement portion that comes into contact with the holder engagement portion in at least one of both side portions in the third direction; and
displacement of the pad in the third direction with respect to the holder is regulated based on contact between the holder engagement portion and the pad engagement portion.

2. The worm reducer according to claim 1, wherein:
the holder has two of the holder engagement portions at positions sandwiching the pad from both sides in the third direction;
the pad has two of the pad engagement portions which come into contact with the holder engagement portion at both side portions in the third direction; and
displacement of the pad in the third direction with respect to the holder is regulated based on contact between the two holder engagement portions and the two pad engagement portions.

3. The worm reducer according to claim 2, wherein:
the two holder engagement portions each have two holder inclined surfaces extending in the first direction and inclined toward each other toward one side in the second direction; and
the two pad engagement portions have two pad inclined surfaces that are in surface contact with the two holder inclined surfaces.

4. The worm reducer according to claim 1, wherein
the pad has a pad elastic pressing portion that applies a preload to a contact portion between the holder engagement portion and the pad engagement portion by elastically pressing a part of the holder toward the other side in the second direction.

5. The worm reducer according to claim 4, wherein:
the holder has two of the holder engagement portions at positions sandwiching the pad from both sides in the third direction;
the pad has two of the pad engagement portions that come into contact with the holder engagement portions at both side portions in the third direction;
displacement of the pad in the third direction with respect to the holder is regulated based on contact between the two holder engagement portions and the two pad engagement portions;
the pad elastic pressing portion is positioned farther on one side in the second direction than the two pad engagement portions, and include two pad elastic pressing plates each extending from a center portion of the pad in the third direction toward sides away from each other in the third direction; and
a part of the holder that is elastically pressed toward the other side in the second direction from the two pad elastic pressing plates includes a holder pressed surface facing one side in the second direction.

6. The worm reducer according to claim 5, wherein
each of the two pad elastic pressing plates is provided with a protrusion extending in the first direction on a side surface on the other side in the second direction, and a tip end portion of the protrusion elastically presses the holder pressed surface toward the other side in the second direction.

7. The worm reducer according to claim 5, wherein
each of the two pad elastic pressing plates has a slit that penetrates in the second direction and extends in the first direction at an end portion on the center side of the pad in the third direction.

8. The worm reducer according to claim 3, wherein
an inclination angle of the holder inclined surface in the second direction is smaller than an inclination angle of the pad inclined surface in the second direction.

9. The worm reducer according to claim 1, wherein the elastic member includes a plate spring.

10. The worm reducer according to claim 9, wherein:
the elastic member has a C-shaped cylindrical shape having a discontinuous portion at one location in the circumferential direction when viewed in the second direction;
the elastic member has a base portion extending toward both sides in the third direction on one side in the first direction, and a pair of arm portions extending from both end portions of the base portion in the third direction toward the other side in the first direction;
each of the pair of arm portions has a base portion side wide portion connected to the base portion and having a plate width of in the second direction, a narrow portion connected to the base portion side wide portion and having a plate width in the second direction, and a tip end portion side wide portion connected to the narrow portion and having a plate width of in the second direction;
the plate width of the base portion side wide portion is the same as the plate width of the tip end portion side wide portion; and
the plate width of the narrow portion is smaller than the plate widths of the base portion side wide portion and the tip end portion side wide portion.

* * * * *